(12) United States Patent
Oiso

(10) Patent No.: US 10,918,955 B2
(45) Date of Patent: Feb. 16, 2021

(54) TECHNIQUES FOR DISPLAYING CHARACTER PLAY RECORDS ON A GAME MAP

(71) Applicant: NINTENDO CO., LTD., Kyoto (JP)

(72) Inventor: Takuma Oiso, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 55 days.

(21) Appl. No.: 16/361,984

(22) Filed: Mar. 22, 2019

(65) Prior Publication Data

US 2019/0217204 A1 Jul. 18, 2019

Related U.S. Application Data

(63) Continuation of application No. 15/718,664, filed on Sep. 28, 2017, now Pat. No. 10,350,499.

(30) Foreign Application Priority Data

Sep. 28, 2016 (JP) .................... 2016-188981

(51) Int. Cl.
| | |
|---|---|
| *A63F 13/5378* | (2014.01) |
| *A63F 13/79* | (2014.01) |
| *A63F 13/67* | (2014.01) |
| *A63F 13/20* | (2014.01) |
| *A63F 13/25* | (2014.01) |

(Continued)

(52) U.S. Cl.
CPC .............. *A63F 13/79* (2014.09); *A63F 13/20* (2014.09); *A63F 13/25* (2014.09); *A63F 13/32* (2014.09); *A63F 13/35* (2014.09); *A63F 13/525* (2014.09); *A63F 13/5378* (2014.09); *A63F 13/67* (2014.09); *A63F 13/95* (2014.09); *A63F 13/497* (2014.09)

(58) Field of Classification Search
None
See application file for complete search history.

(56) References Cited

U.S. PATENT DOCUMENTS

| 6,095,920 A | 8/2000 | Sadahiro |
|---|---|---|
| 8,009,863 B1 | 8/2011 | Sharma et al. |

(Continued)

FOREIGN PATENT DOCUMENTS

| JP | 2009-265830 | 11/2009 |
|---|---|---|
| JP | 2011-194072 | 10/2011 |

OTHER PUBLICATIONS

Notification of Reasons for Refusal dated Aug. 20, 2019 in corresponding Japanese Application No. 2016-188981 (with translation), 6 pages.

(Continued)

*Primary Examiner* — Damon J Pierce
(74) *Attorney, Agent, or Firm* — Nixon & Vanderhye PC

(57) ABSTRACT

A non-limiting example system includes a server, and data of results (play records) that a predetermined game is played in a plurality of game apparatuses independently are transmitted to the server. The server stores the play record for each player, and transmits the play records of respective players to a personal computer. For example, under instructions of a user, the personal computer displays, using the play records of respective players, states of player characters such as movement tracks of the player characters of respective players on a map while adjusting elapsed time from a play start.

20 Claims, 15 Drawing Sheets

(51) Int. Cl.
　　　*A63F 13/32* 　　(2014.01)
　　　*A63F 13/35* 　　(2014.01)
　　　*A63F 13/525* 　(2014.01)
　　　*A63F 13/95* 　　(2014.01)
　　　*A63F 13/497* 　(2014.01)

(56) References Cited

U.S. PATENT DOCUMENTS

2006/0253741 A1　　11/2006　Garakani
2009/0144448 A1*　 6/2009　Smith ............... A63F 13/5258
　　　　　　　　　　　　　　　　　　　　　　　　　709/246
2018/0085672 A1　　 3/2018　Oiso

OTHER PUBLICATIONS

Online Battle, Mario Kart 8 [online], dated Jun. 21, 2014, Web archive as of Jun. 21, 2014 [searched on Aug. 2, 2019], URL, https://web.archive.org/web/20140621235612/http://gamers-high.com/mario-cart8/data/online.html.

Ishibool, Mario Kart 7 Time Trial Ghost7 SFC Mario Circuit 2, YouTube [online] [video], dated Dec. 17, 2011, [searched on Aug. 2, 2019], URL, https://www.youtube.com/watch?v=ACUajnFJGWw.

Chittaro, et al., "Vu-Flow: Visualization Tool for Analyzing Navigation in Virtual Environments", IEEE Transactions on Visualization and Computer Graphics, vol. 12, No. 6, Nov./Dec. 2006 (pp. 1475-1485).

Hoobler, et al., "Visualizing Competitive Behaviors in Multi-User Virtual Environments", Proceedings of Conference IEEE Visualization 2004, Oct. 10-15, 2004 (pp. 163-170).

Drachen, et al., "Analyzing Spatial User Behavior in Computer Games using Geographic information Systems", Proceedings of Conference Mind Trek 2009, Sep. 30-Oct. 2, 2009, (pp. 182-189).

Gagné, et al., "A Deeper Look at the use of Telemetry for Analysis of Player Behavior in RTS Games" Proc. of 10th International Conference on Environment Computing, ICEC 2011 (11 pages).

Kouji Ohno, Technology that makes 3D games entertaining, Japan, published by SB Creative Corp. on Aug. 5, 2014, First Edition First Impression, pp. 582-583.

Search Report dated Aug. 6, 2020 in related European Application No. 19155038.3, 6 pages.

* cited by examiner

MAP 150

POSITION INDICATING SCREEN 200

● POSITION OF PLAYER CHARACTER ON THE GROUND
○ POSITION OF PLAYER CHARACTER EXISTING IN DUNGEON
✕ GAMEOVER POSITION

PASSAGE NUMBER INDICATING SCREEN 300

TECHNIQUES FOR DISPLAYING CHARACTER PLAY RECORDS ON A GAME MAP

CROSS REFERENCE OF RELATED APPLICATION

The application is a continuation of application Ser. No. 15/718,664 filed Sep. 28, 2017, which claims priority to Japanese Application No. 2016-188981 filed on Sep. 28, 2016, each of which is hereby incorporated by reference in their entirety.

FIELD

This application explains a display control apparatus, display control system, display control method and storage medium, in which states in a game of respective player characters are displayed based on play records that the plurality of players independently played a predetermined game while adjusting the elapsed time from a play start.

SUMMARY

It is a primary object of an embodiment(s) to provide a novel display control apparatus, display control system, display control method and storage medium.

Moreover, it is another object of the embodiment(s) to provide a display control apparatus, display control system, display control method and storage medium, capable of presenting information that many players played, to be easily utilized.

A first embodiment is a display control apparatus, comprising: a play record acquisition portion and a display control portion. The play record acquisition portion is configured to acquire play records that a plurality of players independently played a predetermined game, the play record including position information in a game space of respective player characters for every unit play time except play interruption time. The display control portion is configured to display states in the game of the respective player characters on a display based on the play records acquired by the play record acquisition portion while adjusting play elapsed time.

According to the first embodiment, since the states in the game of the respective player characters are displayed based on the play records that a plurality of players independently played the predetermined game while adjusting the play elapsed time, for example, it is possible to know whether the game is progressing as intended by a game developer etc. Moreover, for example, it is possible for the game developer etc. to add, delete or modify information for guiding the player within the game. Furthermore, for example, the game developer etc. can adjust a difficulty level of the game by changing strength of an enemy character, an appearance frequency (appearance probability) and an appearance place of an item, information obtained in the game, etc. Therefore, it is possible to present information that many players played, to be utilized easily.

A second embodiment is the display control apparatus according to the first embodiment, further comprising a map display portion configured to display a map of the game space on the display. The display control portion is configured to display the states in the game of the respective player characters superposed on the map.

According to the second embodiment, since the states in the game of the respective player characters are displayed superposed on the map, it is possible to know the states in the game at a glance.

A third embodiment is the display control apparatus according to the second embodiment, wherein the map display portion is configured to display the map through parallel projection.

According to the third embodiment, it is possible to see the map and the states in the game of the respective player characters in bird's-eye view.

A fourth embodiment is the display control apparatus according to the second embodiment, wherein the map display portion is configured to divide the map into a plurality of areas, and the display control portion is configured to display, in a visible manner, the passage number of the player characters for each divided area or an occurrence frequency of an event in the game generated due to an action of the player character for each divided area.

According to the fourth embodiment, it is possible to easily know a tendency that the player character is moved on the map or a tendency that an event is generated due to an action of the player character.

A fifth embodiment is the display control apparatus according to the fourth embodiment, wherein the display control portion is configured to display, in a visible manner, a difference in the passage number of the player characters for each divided area or a difference in the occurrence frequency of an event for each divided area, with different colors.

According to the fifth embodiment, since the difference in the passage number or the difference in the occurrence frequency is expressed by difference in color, it is possible to more easily to know the passage number or the occurrence frequency.

A sixth embodiment is the display control apparatus according to the first embodiment, further comprising a designation portion configured to designate the play elapsed time. The display control portion is configured to display the states in the game of the respective player characters on the display based on the play records of the respective players up to the play elapsed time designated by the designation portion.

According to the sixth embodiment, since the play elapsed time is designated, it is possible to visually recognize the state in the game at a time the user such as a game developer wants to know.

A seventh embodiment is the display control apparatus according to the sixth embodiment, wherein the display control portion is configured to display positions in the game of the respective player characters on the display based on the play records of the respective players at the play elapsed time designated by the designation portion.

According to the seventh embodiment, it is possible to easily know the positions in the game of the respective player characters at a certain time. That is, it is possible to easily know the degree of progress of the respective player characters.

An eighth embodiment is the display control apparatus according to the sixth embodiment, wherein the display control portion is configured to display movement tracks in the game of the respective player characters on the display based on the play records of the respective players up to the play elapsed time designated by the designation portion.

According to the eighth embodiment, it is possible to easily know the movement tracks in the game of the respective player characters up to a certain time. That is, it is possible to easily know a tendency of the movement track of the player character, and also how to advance the game of each of the respective players.

A ninth embodiment is the display control apparatus according to the sixth embodiment, wherein the play record includes information on an event in the game generated due to an action of the player character, and the display control portion is configured to display the information of an event in the game generated due to an action of each player character on the display based on the play records of the respective players at the play elapsed time designated by the designation portion.

According to the ninth embodiment, it is possible to easily know an event occurred at a certain time.

A tenth embodiment is the display control apparatus according to the ninth embodiment, wherein the display control portion is configured to display on the display, for each predetermined character arranged in the game space of the game, an occurrence frequency of an event relevant to the predetermined character in a visible manner. For example, the number of player characters encountering the predetermined character or acquiring the predetermined character is displayed on the display as the occurrence frequency of the event.

According to the tenth embodiment, when knowing the occurrence frequency of the event for the predetermined character, it is possible to check whether the occurrence frequency is the degree that the game developer intends.

An eleventh embodiment is the display control apparatus according to the sixth embodiment, wherein the play record includes status information of the player character, and the display control portion is configured to display on the display, in a visible manner, the status information of the respective player characters based on the play records of the respective players up to the play elapsed time designated by the designation portion. For example, the status information is a physical strength value of the player character, the number of the predetermined items that the player character possesses, etc.

According to the eleventh embodiment, it is possible to easily know the status information of the respective player characters at a certain time.

A twelfth embodiment is the display control apparatus according to the first embodiment, wherein the play record acquisition portion is configured to acquire the play record from a network.

According to the twelfth embodiment, since the play record is acquired from the network, it is possible to easily acquire many play records. Therefore, it is possible to adjust a difficulty level of the game, etc. based on many play records.

A thirteenth embodiment is the display control apparatus according to the first embodiment, wherein the play record acquisition portion is configured to acquire the play record while changing a timing for acquiring the play record according to a kind of play record.

A fourteenth embodiment is the display control apparatus according to the first embodiment, wherein the play record acquisition portion is configured to collectively acquire the play records at a specific timing. For example, the specific timing is timing that the game is interrupted or ended.

A fifteenth embodiment is a display control system comprising a server and a display control apparatus communicably connected to the server, wherein the server comprises a first play record acquisition portion configured to acquire, from game apparatuses of a plurality of players, play records that the plurality of players independently played a predetermined game, and include position information of respective player characters in a game space for every unit play time excluding a play interruption time; and a play record transmission portion configured to transmit the play records acquired by the first play record acquisition portion to the display control apparatus, and the display control apparatus comprises a second play record acquisition portion configured to acquire the play records transmitted by the play record transmission portion; and a display control portion configured to display states in the game of the respective player characters on a display based on the play records acquired by the second play record acquisition portion while adjusting play elapsed time.

A sixteenth embodiment is a display control method of a computer, comprising steps of: (a) acquiring play records that a plurality of players independently played a predetermined game and include position information of respective player characters in a game space for every unit play time excluding a play interruption time; and (b) displaying states in the game of the respective player characters on a display based on the play records acquired in the step (a) while adjusting play elapsed time.

A seventeenth embodiment is a non-transitory computer-readable storage medium storing a display control program executed by a computer, wherein the display control program causes one or more processors of the computer to execute acquiring play records that a plurality of players independently played a predetermined game and include position information of respective player characters in a game space for every unit play time excluding a play interruption time; and displaying states in the game of the respective player characters on a display based on the play records acquired by the acquiring while adjusting play elapsed time.

According to any one of the fifteenth to seventeenth embodiments, like the first embodiment, it is also possible to present information that many players played, to be utilized easily.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
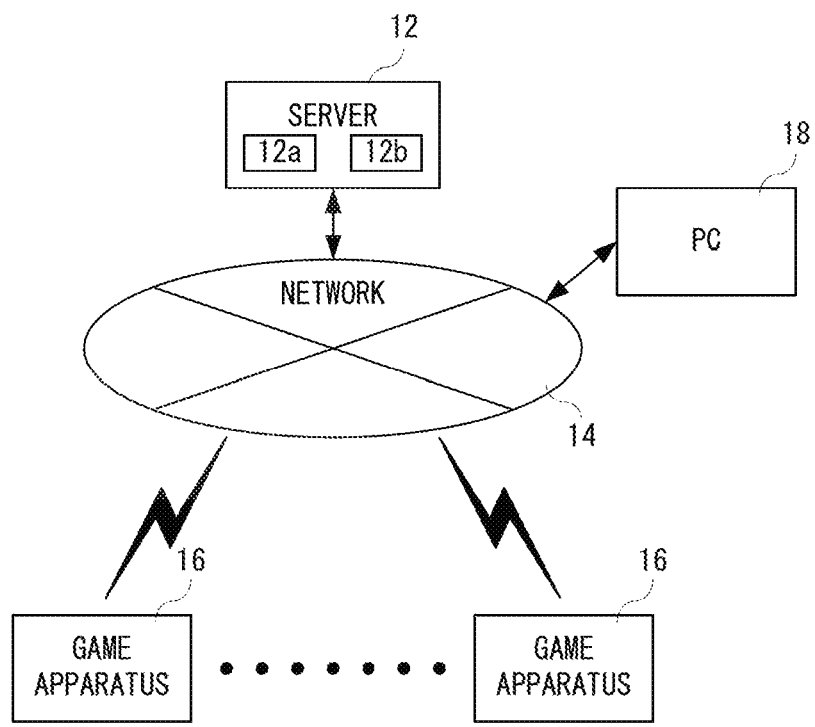
FIG. 1 is an illustration view showing a non-limiting example system.

With reference to FIG. 1, a non-limiting example system 10 includes a server 12. The server 12 is connected with a plurality of game apparatuses 16 and a personal computer (PC) 18 in a communicable manner via a network 14 such as LAN, WAN, Internet. In this embodiment, the game apparatus 16 is a stationary game apparatus used for a test play, and is a game-dedicated apparatus for testing or a computer capable of executing a test game program.

The server 12 is a general-purpose server, and comprises a CPU 12a and an HDD 12b, and also comprises a further memory such as a RAM and other components such as a communication module. The CPU 12a is in charge of overall control of server 12. The HDD 12b functions as a main storage of the server 12 and also as a database. However, a database may be provided in an exterior of the server 12 and may be connected to the server 12 directly or via the network 14.

For example, the server 12 executes a control program, receives (acquires) predetermined data transmitted from the game apparatuses 16, and stores and manages the data for each of the game apparatuses 16 (players) in the HDD 12b. Moreover, the above-mentioned predetermined data is data of play records transmitted from respective game apparatuses 16.

Figure 2:
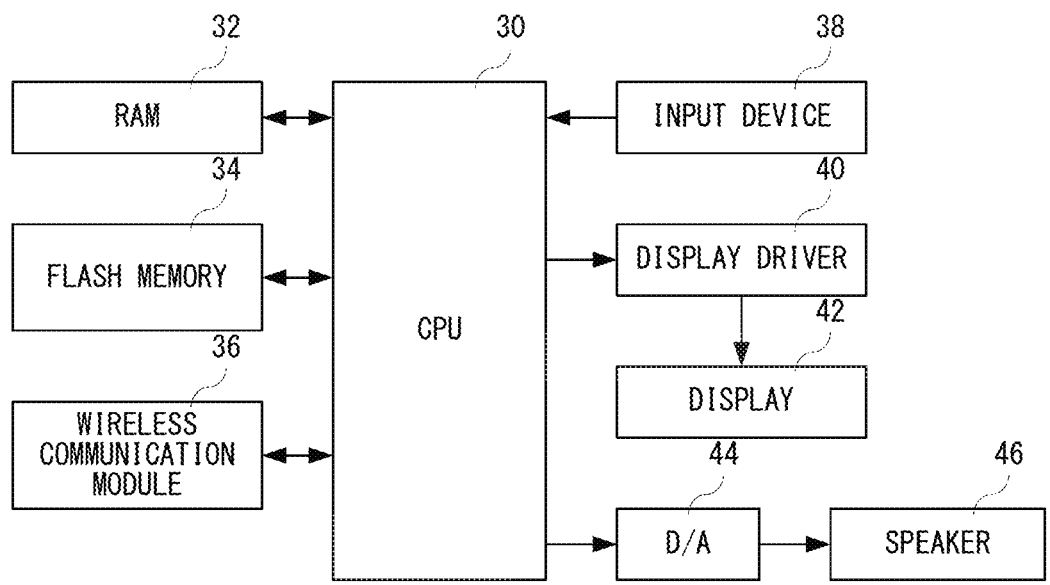
FIG. 2 is a block diagram showing non-limiting example electric structure of a game apparatus shown in FIG. 1.

FIG. 2 is a block diagram showing non-limiting example electric structure of the game apparatus 16 shown in FIG. 1. As shown in FIG. 2, the game apparatus 16 includes a CPU 30, and the CPU 30 is connected with a RAM 32, a flash memory 34, a wireless communication module 36, an input device 38, a display driver 40 and a D/A converter 44. Furthermore, a display 42 is connected to the display driver 40, and a speaker 46 is connected to the D/A converter 44.

The CPU 30 is in charge of overall control of the game apparatus 16. The RAM 32 is used as a working memory and a buffer memory for the CPU 30. The flash memory 34 is used in order to store (save) application programs such as a game, and various kinds of data.

The wireless communication module 36 has a function of connecting to a wireless LAN. Therefore, the game apparatus 16 can perform communication with other game apparatuses 16 and computers (server 12, personal computer 18, etc.) via the network 14. However, the game apparatus 16 can also perform communication directly with other game apparatuses 16 or/and computers without the network 14. Moreover, the game apparatus 16 may be connected to the network 14 with a cable.

The input device 38 is various kinds of push buttons or switches provided on the game apparatus 16, for example, and used for various kinds of operations such as menu selection and game operation by a player. However, as the input device 38, a pointing device such as a touch panel, an input means such as a microphone, a camera, etc. may be provided instead of the push buttons or switches, or in addition to the push buttons or switches.

The display driver 40 is used in order to display various kinds of screens such as an execution screen (game screen, for example) of an application on the display 42 under instructions of the CPU 30. Although illustration is omitted, the display driver 40 contains a GPU and a VRAM.

The D/A converter 44 converts sound data applied from the CPU 30 into an analog sound signal, and outputs the same to the speaker 46. When an application is a game, for example, the sound signal may be a sound signal corresponding to sounds required for the game, such as an imitation sound of a game character, sound effects and music (BGM). Furthermore, in case of an application other than a game, a sound signal may be a sound signal corresponding to sounds required for execution of the application, such as sound effects and music (BGM).

In addition, the electric structure of the game apparatus 16 shown in FIG. 2 is a mere example, and it does not need to be limited to this.

Figure 3:
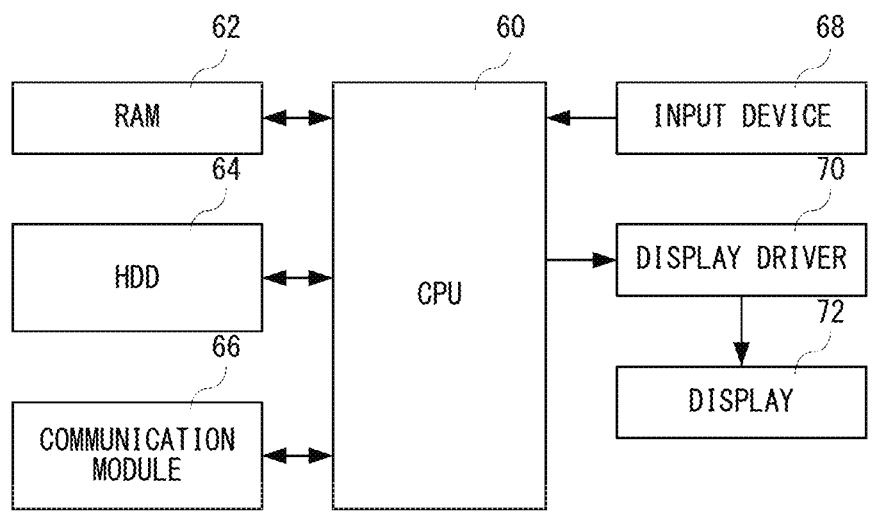
FIG. 3 is a block diagram showing non-limiting example electric structure of a personal computer shown in FIG. 1.

FIG. 3 is a block diagram showing non-limiting example electric structure of personal computer 18 shown in FIG. 1. The personal computer 18 is a general-purpose computer, and as shown in FIG. 3, includes a CPU 60. A RAM 62, an HDD 64, a communication module 66, an input device 68 and a display driver 70 are connected to the CPU 60. Furthermore, a display 72 is connected to the display driver 70. The CPU 60 is in charge of overall control of personal computer 18. The RAM 62 is used as a working memory and a buffer memory for the CPU 60. The HDD 64 is a main storage of the personal computer 18, and used in order to store an operating system (OS), necessary control programs (application program) and predetermined data. For example, the predetermined data may be data of play records of a plurality of players. Moreover, the control program may be a display control program, and as mentioned later, which displays states of respective player characters in the game based on the play records of the plurality of players while adjusting elapsed times (equivalent to "play elapsed time") from a play start.

The communication module 66 has a function of connecting to a LAN. Therefore, the personal computer 18 can perform communication with other computers (server 12, etc.) and game apparatuses 16 via the networks 14. However, the personal computer 18 can also perform communication directly with other computers or/and game apparatuses 16 without the network 14.

The input devices 68 may be a keyboard, a computer mouse, etc., for example. The display driver 70 is used in order to display various screens on the display 72 under instructions of the CPU 60. The display driver 70 incorporates a GPU and a video RAM (VRAM).

In addition, the electric structure of the personal computer 18 shown in FIG. 3 is a mere example, and it does not need to be limited to this.

Figure 4:
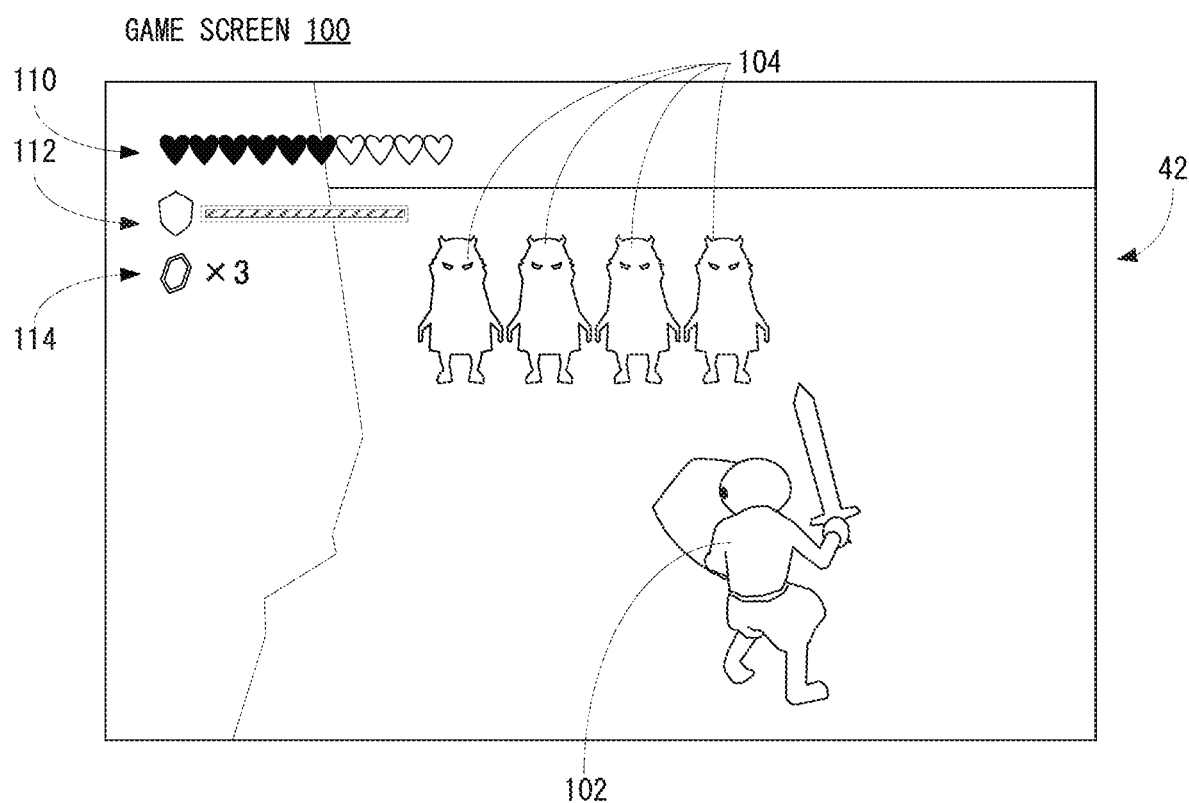
FIG. 4 is an illustration view showing a non-limiting example game screen displayed on a display of the game apparatus shown in FIG. 2.

In the above-mentioned game apparatus 16, it is possible to play a game in a virtual space (in a virtual game space). A non-limiting example game screen 100 displayed on the display 42 in the game of this embodiment is illustrated in FIG. 4. Although detailed description is omitted, in the virtual game space, virtual objects such as plants (including flowers) objects, terrain objects and building objects are provided and a player character 102 is arranged. Moreover, in the virtual game space, there are also arranged non-player characters such as enemy characters 104 and villager characters (not shown). Furthermore, an item character (not shown) is arranged in the virtual game space. However, the non-player character and the item character also include predetermined characters not directly related to a main part of the game. For example, the predetermined character is placed (hidden) in the virtual game space as a collectable element not directly related to the progress of the game, and is collected by the player or the player character 102. The non-player character and the item character may be made to occur (appear) according to predetermined conditions (event). An image that such a virtual game space is imaged by a virtual camera (not shown) is displayed on the display 42 as a game screen. Specifically, a three-dimensional virtual game space image viewed from a specific viewpoint (virtual camera) is drawn using perspective projection conversion and displayed as a game screen 100.

As shown in FIG. 4, the player character 102, the enemy character 104 and the virtual objects (a terrain object and a cliff (wall) object) are displayed on the game screen 100. In the game screen 100 shown in FIG. 4, the player character 102 is displayed slightly lower right from the center of the screen. The player character 102 of this embodiment holds a weapon (sword, for example) and a protector (shield, for example). Moreover, in the game screen 100, a plurality of (four, in this example) enemy characters 104 are displayed lined up slightly above the center of the screen. In this game screen 100, the enemy characters 104 confront (face) the player character 102.

Furthermore, in a upper left in the game screen 100, an image (heart-shaped image) 110 showing a physical strength value (life force) of the player character 102, an image 112 showing a defense power of the shield held by the player character 102 and an image 114 showing the possession number of predetermined items are displayed. Status information of the player character 102 is thus displayed. However, the status information is an example, and any one of the physical strength value, the defense power and the possession number may be displayed. Moreover, other status information such as a level of the player character 102 (player) may be displayed instead of or in addition to either of the above-mentioned status information.

The game of this embodiment is an open world game, and the player character 102 can freely move according to an operation of a player within a vast map that is set in the virtual game space. In the virtual game space, the player character 102 fights with the enemy character 104, acquires an item, or arrives at a target place or position, thereby achieving a final purpose.

However, when the physical strength value runs out (becomes 0 (zero)), the game is over. The physical strength value is decreased when the player character 102 performs an action such as a movement etc. Moreover, the physical strength value may be decreased by being cold or hot. When the player character 102 receives the attack from the enemy character 104, or also when the player character 102 gets out outside the virtual game space due to falling to the bottom of a valley (case of miss), the game is over. On the other hand, the physical strength value is increased when the player character 102 eating food, taking medicine or taking sleep.

In this embodiment, when the physical strength value of the player character 102 runs out or the player character 102 was knocked down by the enemy character 104, the game is over, but it does not need to be limited to this. For example, the certain number of miss may be permitted by setting remaining lives. In such a case, when the remaining lives of the player character 102 becomes 0 (zero), the game is over. Moreover, even when the physical strength value of the player character 102 runs out or the player character 102 is knocked down by the enemy character 104, the game is not over and the game may be restarted immediately (respawn) from a predetermined place in the game.

When manufacturing such a game, a work for adjusting a difficulty level of the game is important, and a record that a game is test-played before released (play record) may be analyzed. For example, it is analyzed whether a game is played according to a total play time, the degree of progress of the game according to the play time, a movement track or movement path (how to progress) of the player character 102, etc., which the game developer etc. assumed. For this analysis, the game developer etc. listen to impression of the game from many players who test-played, or perform a questionnaire to many players.

However, only for grasping the test-played records, the game developer etc. needs a great deal of effort. Further, as mentioned above, the map is particularly vast in the open world game, and a way of game play also varies for player to player. Moreover, the game cannot be finished with once test play, and the game is made to progress while repeating interruption and restart. For this reason, a method for looking-down at and understanding upon such a large-scale game play record is required.

Therefore, in this embodiment, play records obtained through test-played are collected form respective game apparatuses 16, and information (contents) for analyzing the collected play records are displayed in a visible manner.

In this embodiment, positions of the player character 102 at every elapsed time from a play start in a test play, and a history of event occurrence (the elapsed time from a play start and position of the player character 102 at the time that the event occurs) are stored (acquired) in each game apparatus 16 as a play record (hereinafter, may be called "individual play record"), and the same is transmitted to the server 12.

However, the elapsed time means a time that the player actually plays the game is accumulated from a play start (a total play time up to the present time), and the time that the game is interrupted is excluded. Moreover, in this embodiment, the elapsed time is obtained by also excluding the time that the player character 102 is not operated at all.

Moreover, identification information for identifying the game apparatus 16 or the player of the game apparatus 16 is added to the individual play record. For example, the identification information is a name of the player, which is registered (set up) into the game apparatus 16. However, the identification information does not need to be limited to the name of the player, and a serial number or product number of the game apparatus 16, a MAC address that is assigned to the wireless communication module 36 provided on the game apparatus 16, etc. may be sufficient. Moreover, information that these pieces of inherent information are combined with each other may be used as the identification information.

Furthermore, a game start (play start) means starting a virtual game from the beginning (start position), and the term "play start" does not include starting from the time of saving (intermediate point).

In this embodiment, the event is an event that occurred due to an action of the player character 102. Specifically, various matters that occur when predetermined conditions are satisfied in the game correspond to the event, such as a fact that the player character 102 having won or lost the battle with the enemy character 104, a fact that the player character 102 encountered the predetermined character, a fact that the player character 102 rode on the moving means of a horse etc., a fact that the player character 102 acquired the item, a fact that the player character 102 invaded or arrived at the predetermined place (for example, dungeon), etc.

When the player character 102 moves in the game space, the game apparatus 16 transmits to the server 12, with a predetermined cycle (corresponds to "at every unit play time"), information on the position of the player character 102 corresponding to the elapsed time from a play start, as the individual play record. That is, the server 12 collects the information on the position of the player character 102 with the predetermined cycle. Moreover, the game apparatus 16 transmits to the server 12, when an event occurs, information on the position of the player character 102 corresponding to the elapsed time and information on the event, as the individual play record. That is, the server 12 collects the information on an event when the event occurs. However, the information on the event is information indicating what event occurred. Moreover, in this embodiment, the predetermined cycle is 1 (one) second. Although the game screen is updated at every unit time (1 (one) frame) in game processing, in this embodiment, a frame rate is changeable dependent on a processing load (variable frame rate). Therefore, the game apparatus 16 counts the number of seconds according to the current frame rate (added to the elapsed time), and at every time that the elapsed time elapses 1 (one) second, acquires (stores) the information on the position of the player character 102 corresponding to the elapsed time (the information on the event may be added), as the individual play record. For example, 1 (one) frame is ¹⁄₆₀ seconds when the frame rate is 60 fps, 1 frame is ¹⁄₃₀ seconds when the frame rate is 30 fps, and 1 frame is ¹⁄₂₀ seconds when frame rate is 20 fps.

However, this is an example, and the play record may be stored (accumulated) in a memory (RAM 32) of the game apparatus 16 so as to be collectively transmitted to the server 12 at a predetermined timing that the game is interrupted or ended.

Moreover, the predetermined cycle may be 0.5 seconds, the number of seconds equivalent to 1 (one) frame, or 2 seconds or more, and may be changed suitably according to the type of the game, etc. Furthermore, in this embodiment, although a game of a variable frame rate will be explained, in a case of a fixed frame rate, the predetermined time decided by the frame rate is merely added to the elapsed time for each frame. However, in the case of the fixed frame rate, since the time for each frame is constant, processing at predetermined time intervals can also be realized by acquiring information for each predetermined frame.

The server 12 stores and manages the individual play records acquired from respective game apparatuses 16, for each of the game apparatuses 16 or players. When acquiring the individual play record from the game apparatus 16, the server 12 specifies the game apparatus 16 or player from the identification information applied to the play record, and then, stores (updates) the individual play record for the specified game apparatus 16 or player. When updating the individual play record, the server 12 additionally stores the position of the player character 102 corresponding to the elapsed time from a play start and the information on the event.

For example, the user such as a game developer etc. operates the personal computer 18 in order to acquire the individual play records of respective players from the server 12. That is, the personal computer 18 acquires the individual play records of the respective players from the network 14. However, the personal computer 18 may acquire the individual play record from each of the game apparatuses 16 through the network 14. Alternately, the personal computer 18 may acquire the individual play records collected by the server 12 or the individual play record stored in the game apparatus 16, using an attachable/detachable storage medium.

According to an operation by the user, the personal computer 18 presents, in a visible manner, states (predetermined information) in the game of the respective player characters 102 using respective individual play records. In this embodiment, as the predetermined information, it is possible to selectively display the positions of the respective player characters 102 at a certain time (elapsed time), the movement tracks of the respective player characters 102 from a play start up to the elapsed time, the number (passage number) of player characters 102 passing respective areas from a play start up to the elapsed time in case where the map is divided into a plurality of areas, or the number (encounter number) of the player characters 102 encountering a predetermined character from a play start up to the elapsed time.

However, the passage number includes not only the number of the player characters 102 passing through the respective areas but the number of the player characters 102 arrived (invaded) at the respective areas.

Figure 5:
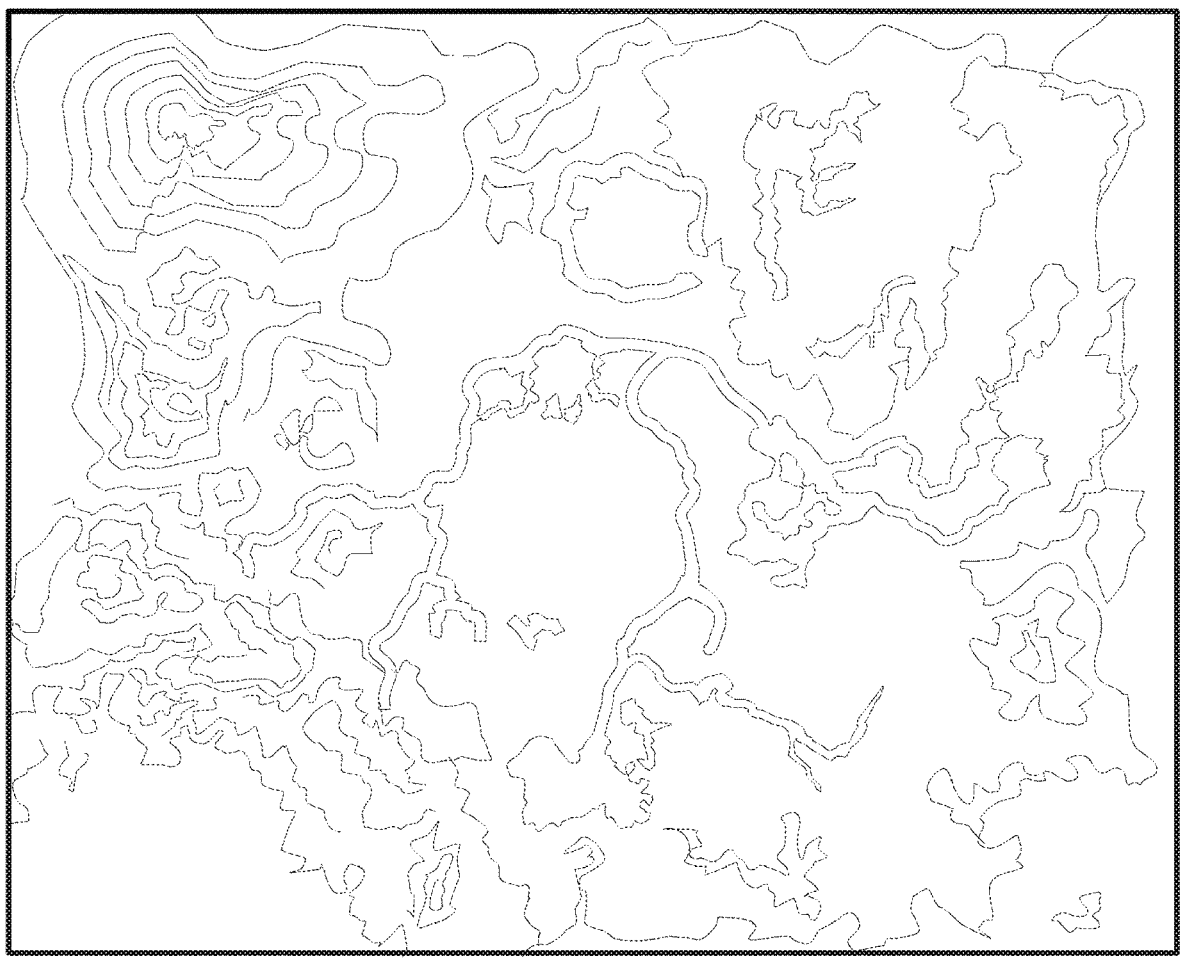
FIG. 5 is an illustration view showing a non-limiting example map displayed on a display of the personal computer shown in FIG. 3.

FIG. 5 is an illustration view showing a non-limiting example map 150 displayed on the display 72 of the personal computer 18. This map 150 is a map of the above-mentioned game, and is a two-dimensional image when viewing the three-dimensional virtual game space from right above. Specifically, an image viewing the three-dimensional virtual game space from a viewpoint (virtual camera) being set right above is projected on a two-dimensional virtual screen by parallel projection (also called orthogonal projection), and the projected two-dimensional image is displayed as the map 150. In this embodiment, at least one piece of information on the above-mentioned position, movement track, the passage number and the encounter number is displayed superposed on this map 150 in a visible manner. By using the map image drawn by the parallel projection, it is possible to display a distribution and positional relationship of respective pieces of the information in an easily graspable manner. In another embodiment, as an image to be displayed as a map, an image drawn so as to correspond to an actual terrain of the virtual game space may be prepared separately to be used, rather than an image drawn by imaging the actual virtual game space by the virtual camera.

Although illustration is omitted, an operation area for designating the elapsed time, selecting a player individually or selecting information (content) to be displayed on the map 150 is established (displayed) around the map 150.

Although illustration is also omitted, a text display area for displaying information on the event that occurs at the designated elapsed time with a text is established (displayed) around the map 150 aside from the operation area.

Figure 6:
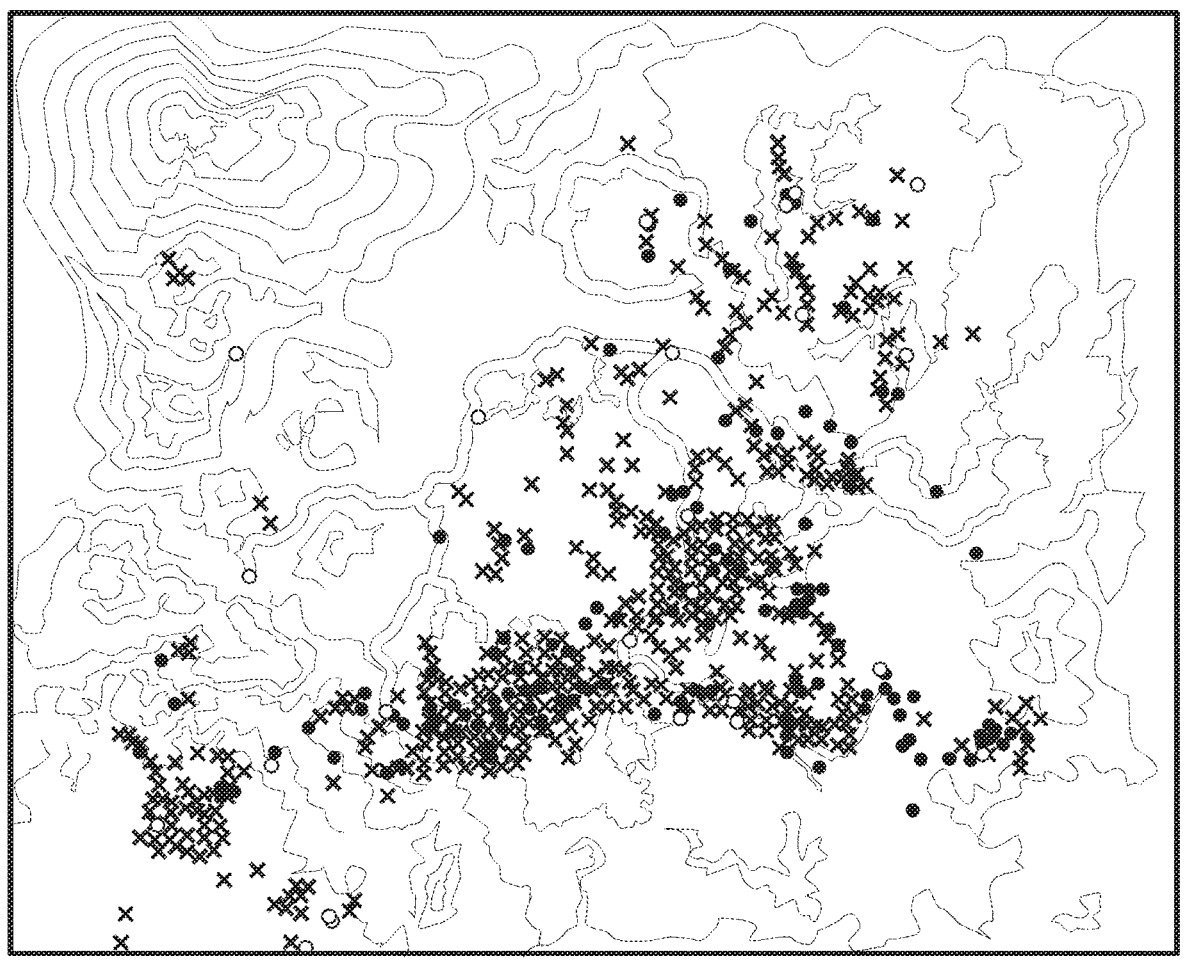
FIG. 6 is an illustration view showing the map and positions of respective player characters at a certain elapsed time, displayed on the display of the personal computer shown in FIG. 3.

FIG. 6 is an illustration view showing a non-limiting example position indicating screen 200 displayed on the display 72 of the personal computer 18. For example, if the user designates the elapsed time and selects to display the positions of the respective player characters 102 in the operation area by using the input device 68, the position indicating screen 200 as shown in FIG. 6 will be displayed on the display 72.

As shown in FIG. 6, in the position indicating screen 200, the positions of the respective player characters 102 of the respective players at a certain time point (time) are displayed superposed on the map 150 in a visible manner. The certain time point means the elapsed time from a play start, which being designated by the user. The user can arbitrarily designate the elapsed time within a predetermined range. For example, a slide bar for designating the elapsed time is provided in the operation area, and the user can designate the elapsed time by operating the slide bar. However, this is an example, and a graphical user interface (GUI) for designating the elapsed time is not limited to this. Moreover, the predetermined range is set between 0 hour, 0 minute, 0 second and a time longer than a total play time intended by the game developer etc. (for example, 1.2 times-1.5 times of the total play time).

In the position indicating screen 200, a circle is the position of the player character 102 at a certain time. Here, the information on the position that is stored corresponding to the certain time is acquired from each of the individual play records of a plurality of players, and then, the circle is drawn at that position on the map 150. Moreover, in FIG. 6, a black circle indicates that the corresponding player character 102 is on the ground, and a white circle indicates that the corresponding player character 102 exists in a dungeon. That is, in the individual play record, when an event of being in a dungeon corresponding to the certain time occurred, the white circle is drawn. However, when an event of being in a dungeon corresponding to a certain time has not occurred, the black circle is drawn. These matters are the same also in a movement track indicating screen 250 of FIG. 7.

Furthermore, in the position indicating screen 200, a cross (x) mark is drawn at a position where the game is over, such as when the player character 102 is knocked down by the enemy character 104 up to the designated elapsed time. Here, from each of the individual play records of a plurality of players, information on an event at the time of game over and information on the position among the events stored up to the certain time point are acquired, and the cross mark is drawn at that portion on the map 150.

Although omitted in FIG. 6, the identification information of the player (for example, a name of the player) is displayed near each circle, and therefore, it is possible to know at a glance the player character 102 of an arbitrary player is in what place at the designated elapsed time (time point).

Moreover, it is possible to know, by seeing the position of the cross (x) mark, a position that the enemy character 104 that knocked down the player character 102 is arranged, a place that the player character 102 falls easily, etc., for example. Therefore, according to a progress situation of the game up to the designated elapsed time (at the time point), it is possible to know whether an appropriate type and number of enemy characters 104 are arranged at an appropriate position. Moreover, it is also possible to know whether a design of the virtual game space (arrangement of virtual objects) is appropriate.

Furthermore, although omitted in FIG. 6, as mentioned above, then operation area and the text display area are provided around the position indicating screen 200. For example, on the text display area, a text sentence such as "Mr. A acquired the item X", "Mr. B knocked down the enemy character Y" as the information on the event at the designated elapsed time (at the time point). In addition, "A" and "B" are the names of the players. These matters are the same also in each of screens of FIG. 7 to FIG. 9 mentioned later.

Figure 7:
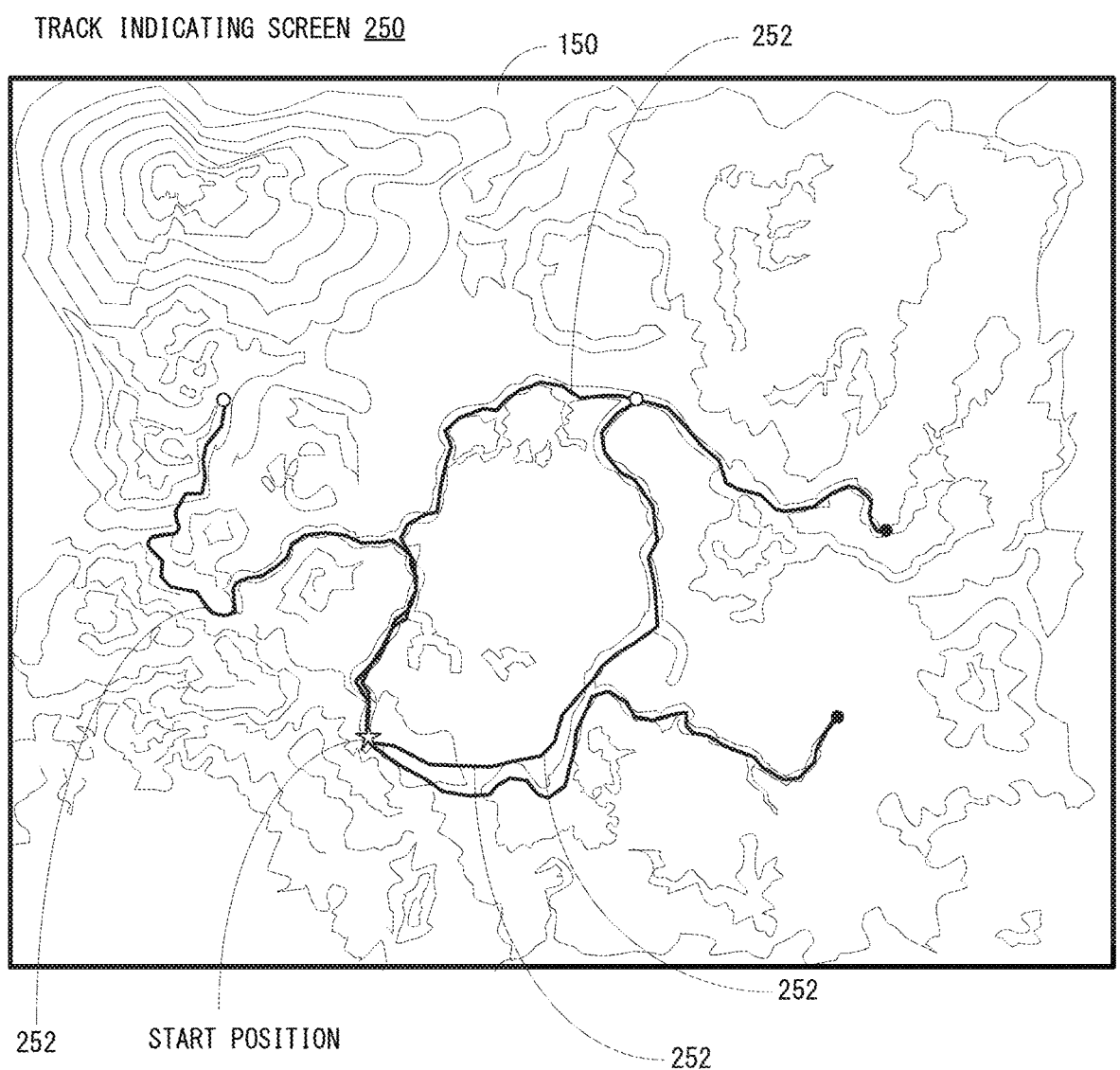
FIG. 7 is an illustration view showing the map and movement tracks of some player characters up to a certain elapsed time, displayed on the display of the personal computer shown in FIG. 3.

FIG. 7 is an illustration view showing a non-limiting example movement track indicating screen 250 displayed on the display 72 of the personal computer 18. For example, if the user designates the elapsed time and selects to display the movement tracks of the respective player characters 102 in the operation area by using the input device 68, the movement track indicating screen 250 as shown in FIG. 7 will be displayed on the display 72.

As shown in FIG. 7, in the movement track indicating screen 250, the movement tracks 252 of the respective player characters 102 of the respective players up to a certain time point (time) are displayed superposed on the map 150 in a visible manner. Here, the information on the position that is stored corresponding to respective elapsed time from a play start up to a certain time is acquired from each of the individual play records of a plurality of players, and then, a movement track 252 for each player character 102 is drawn on the map 150. However, in FIG. 7, for the sake of clarity, the movement tracks 252 of the player characters 102 of four (4) players are shown. In fact, it is possible to display the movement tracks 252 of the player characters 102 of some or all of the players the user selected.

In addition, in FIG. 7, the position of the player character 102 at the time of a play start (start position) is indicated with a star mark. That is, a start position is being fixed at a single place in the virtual game of this embodiment. However, this is an example, a plurality of start positions may be prepared, whereby a start position can be selected by the player, or the computer (CPU 30) can arbitrarily select a start position.

By thus displaying the movement track 252, it is possible to know how to move (progress) the player character 102 for each player, and the degree of progress of each player character 102 up to a certain time. For example, if the respective players are classified in advance into an advanced player, an intermediate player and a beginner player, and by displaying the movement track 252 for each classification, it is possible to know how the player character 102 tends to be moved in each classification. By this, it is possible to know appropriateness, such as a manner of guidance of the player, arrangement and appearance probability of the enemy character 104 and the item, a type, strength and number of the enemy character 104, a type and number of items, and it is possible to modify those contents.

Figure 8:
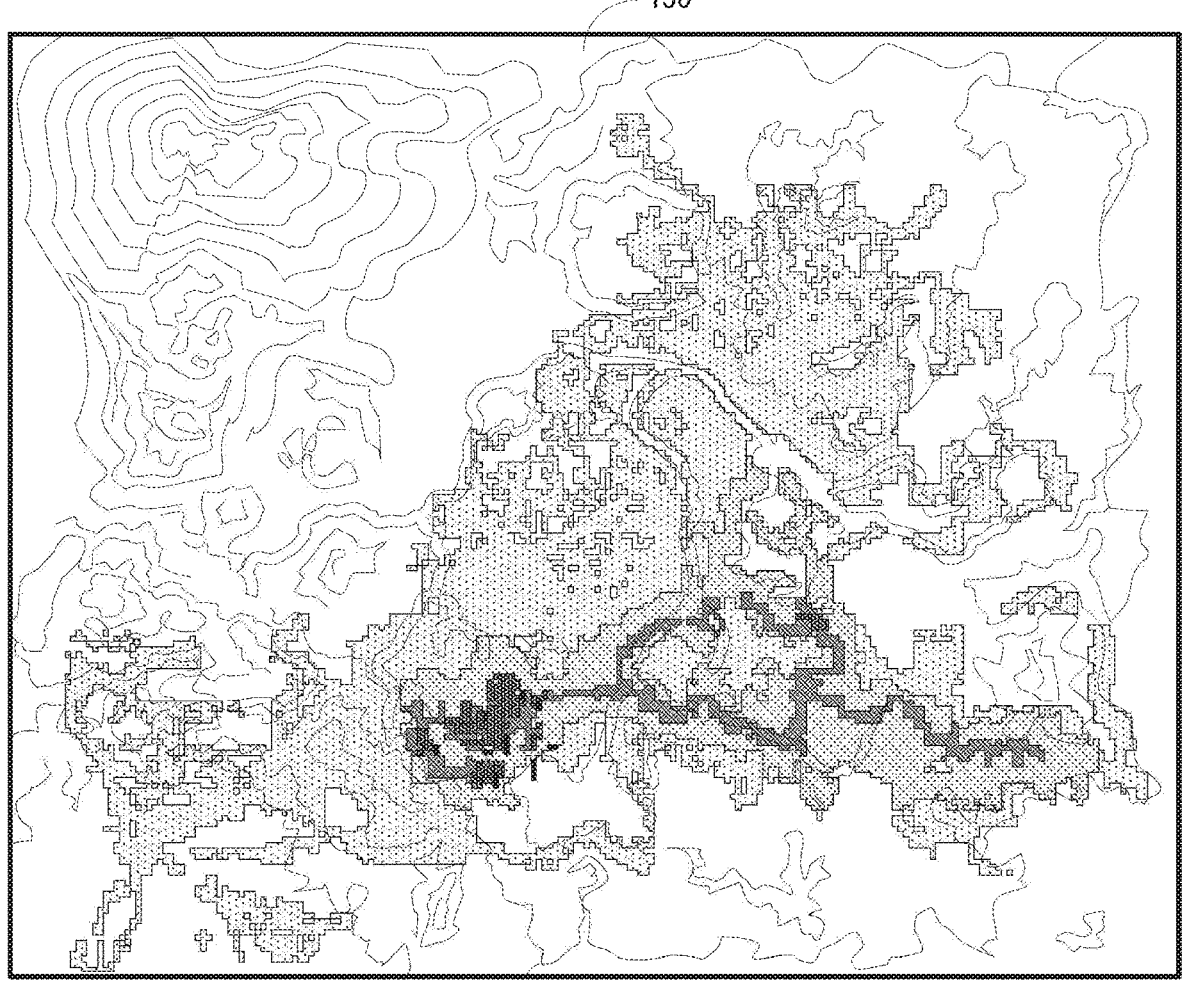
FIG. 8 is an illustration view showing the map and a distribution of the number of the player characters passing respective areas up to a certain elapsed time, displayed on the display of the personal computer shown in FIG. 3.

FIG. 8 is an illustration view showing a non-limiting example passage number indicating screen 300 on the display 72 of the personal computer 18. For example, if the user designates the elapsed time and selects to display the passage number of the player characters 102 in the operation area by using the input device 68, the passage number indicating screen 300 as shown in FIG. 8 will be displayed on the display 72.

As shown in FIG. 8, in the passage number indicating screen 300, in case where the map 150 is divided into a plurality of areas, the number (passage number) of the player characters 102 passing respective areas up to a certain time point is displayed superposed on the map 150 in a visible manner. For example, the map 150 is divided into grids, and the number of the player characters 102 passing an area corresponding to each grid or invading into (being arrived at) the area concerned is counted. Here, the information on the positions that are stored corresponding to respective elapsed time from a play start up to a certain time are acquired, and if there is the information on the position included in the area corresponding to the grid, the count number is incremented by 1 (one). Such processing is performed for each of the individual play records of a plurality of players, and the passage number the respective grids is counted.

However, in this embodiment, even if a single player character 102 passes through the same area plural times or invades into the same area plural times, the number to be counted is only 1 (one). However, depending on the type of game, the total number of times may be counted.

Colors according to the passage number are applied to respective grids, and thus, a heat map is generated, for example. The heat map is displayed on the front of the map 150. In this embodiment, the grid is colored into blue, green, yellow, orange or red in an order from the smaller number. That is, a magnitude (difference) of the passage number is displayed, in a visible manner, as a difference in color. However, for the sake of convenience of the drawing, in FIG. 8, the magnitude of the passage number is indicated by a shade of gray. That is, the smaller the passage number, the higher the gray brightness and the larger the passage number, the lower the gray brightness.

Thus, by displaying the passage number of each grid (area) with the heat map, it is possible to understand the magnitude of the passage number at a glance. Therefore, it is possible to grasp a rough trend of a course for the player to move the player character 102 according to the elapsed time from a play start, and it is possible to confirm whether a typical (larger the passage number) course is close to a course that the game developer etc. intend. For example, when many player characters 102 pass the course different from a course that the game developer etc. intend, it is possible to add and modify an element capable of guiding the player or the player character 102.

In addition, in this embodiment, although the passage number of the player characters 102 in the respective areas up to a certain time is displayed as the heat map, it does not need to be limited to the passage number. For example, a difference in occurrence frequency of the event, such as the total number of the events occurring for each area, the number of the predetermined events occurring in each area, etc. may be displayed by a heat map (displayed in a visible manner due to a difference in color). However, this event is an event that is also generated die to an action of the player character 102, included in the individual play record.

Figure 9:
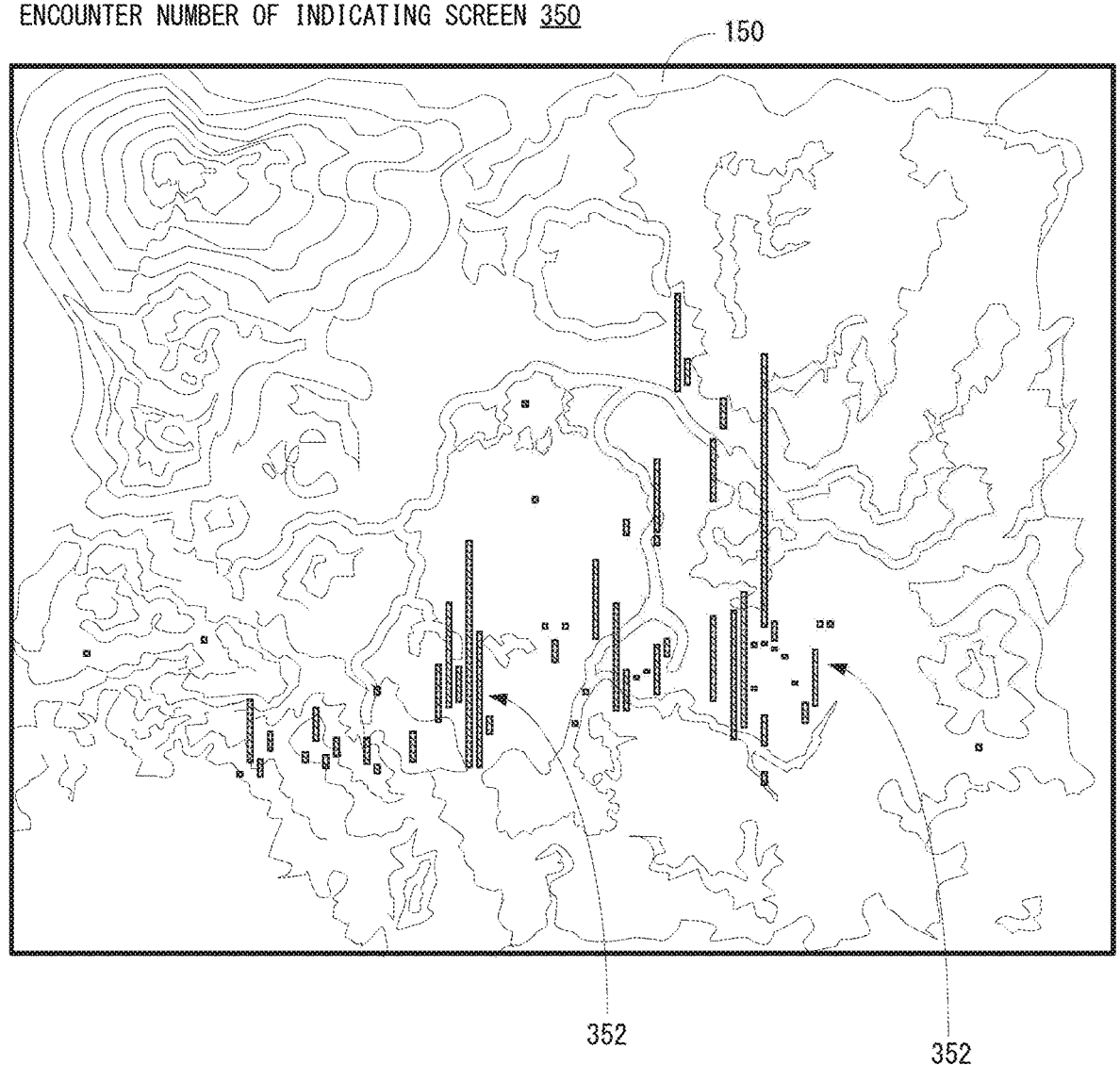
FIG. 9 is an illustration view showing the map and the number of the player characters encountering a predetermined character up to a certain elapsed time, displayed on the display of the personal computer shown in FIG. 3.

FIG. 9 is an illustration view showing a non-limiting example encounter number indicating screen 350 displayed on the display 72 of the personal computer 18. For example, if the user designates, in the operation area by using the input device 68, the elapsed time and selects to display the encounter number of the player characters 102 encountering the predetermined character, the encounter number indicating screen 350 as shown in FIG. 9 will be displayed on the display 72.

As shown in FIG. 9, in the encounter number indicating screen 350, the encounter number of the player characters 102 (players) encountering the predetermined character is displayed superposed on the map 150 in a visible manner.

Here, the information on the event encountering the predetermined character from a play start up to the certain time point and the information on the corresponding position are acquired from each of a plurality of individual play records, and the encounter number of the player characters 102 is counted for each predetermined character. Then, a bar chart 352 according to a count value for each predetermined character is drawn on the map 150. However, an image of each bar is drawn at a position corresponding to a position or area that the player character 102 encountered the predetermined character.

By thus displaying the bar chart 352 in this manner, it is possible to grasp the number of encounters with the player character 102 for each predetermined character, it is possible to easily confirm whether the probability of encounter becomes probability that the game developer etc. intend. For example, in a case of a character (rare) intended to be set difficult to find out in the game, it is conceivable to lower the probability of encounter, but in a case of a character (not rare) intended to be set easy to find out, it is conceivable to higher the probability of encounter. Specifically, by changing an arrangement of the character, or by changing a way presenting a hint that is presented in the game in order to find out the character, it is possible to approach the game an intended specification.

In addition, in FIG. 6-FIG. 9, for the sake of clarity, cases where information anyone of the position, the movement track, the passage number and the encounter number of the player character 102 is displayed superposed on the map 150; however, two or more pieces of information may be selectively displayed on the map 150.

Moreover, although illustration is omitted, when only the elapsed time is selected with selecting displaying no information on the position, the movement track, the passage number and the encounter number of the player character 102, the map 150, the operation area and the text display area in which a text sentence of an event occurred in the elapsed time are displayed on the display 72. In such a case, the map 150 does not need to be displayed.

Figure 10:
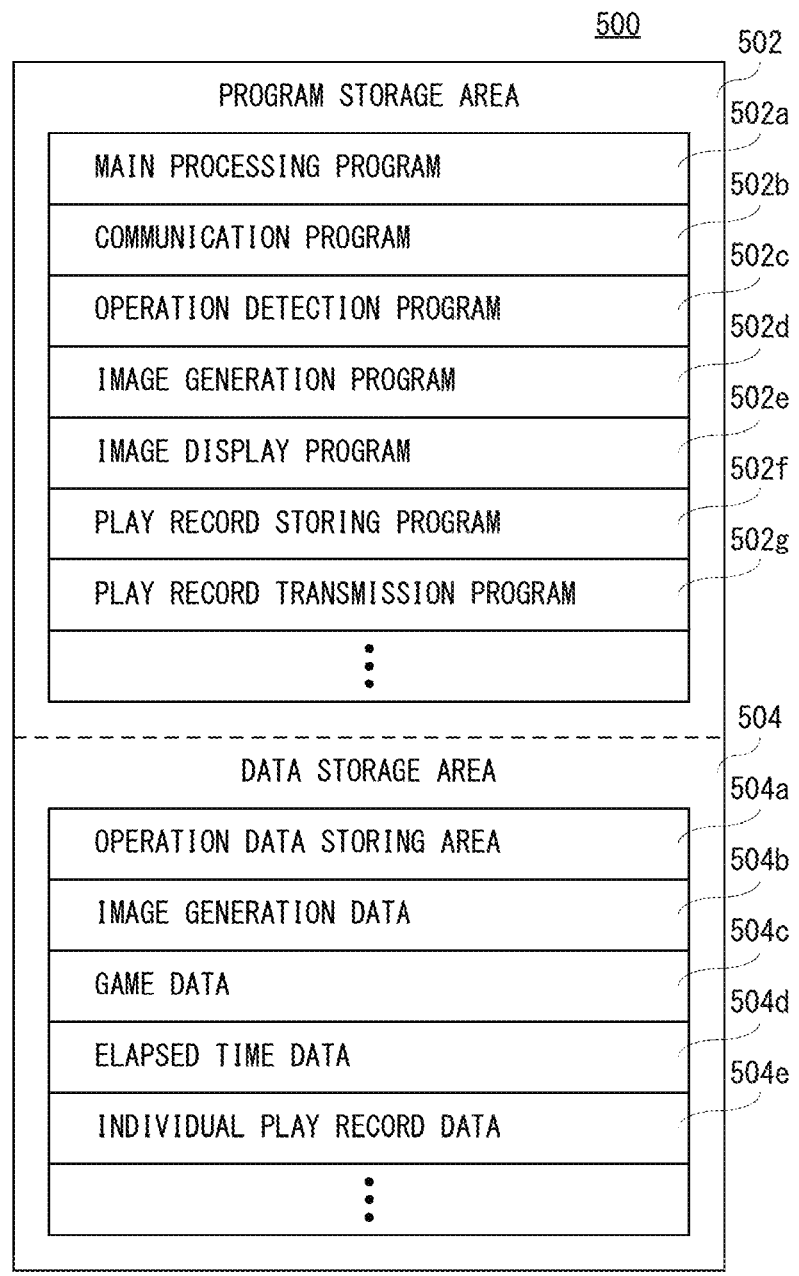
FIG. 10 is an illustration view showing a non-limiting example memory map of a RAM of the game apparatus shown in FIG. 2.

FIG. 10 is an illustration view showing a non-limiting example memory map 500 of the RAM 32 of the game apparatus 16 shown in FIG. 2. The RAM 32 includes a program storage area 502 and a data storage area 504. A game program that is an example of an information processing program is stored in the program storage area 502, and the game program includes a main processing program 502a, a communication program 502b, an operation detection program 502c, an image generation program 502d, an image display program 502e, a play record storing program 502f, a play record transmission program 502g, etc.

The main processing program 502a is a program for executing a main routine of game processing of this embodiment. The communication program 502b is a program for performing communication with other game apparatuses 16 and computers. The operation detection program 502c is a program for detecting operation data that is input from the input device 38 and storing the same in the data storage area 504 of RAM 32.

The image generation program 502d is a program for generating; using image generation data 504b mentioned later, game image data corresponding to game images such as the game screen etc. to be displayed on the display 42. The image display program 502e is a program for outputting the game image data generated according to the image producing program 502d to the display 42. Therefore, a game image is displayed on the display 42.

The play record storing program 502f is a program for acquiring individual play record data 504e and storing the same in the data storage area 504. The play record transmission program 502g is a program for transmitting the individual play record data 504e stored according to the play record storing program 502f to the server 12. At this time, the game apparatus 16 performs communication with the server 12 according to the communication program 502b.

Although illustration is omitted, in the program storage area 502, a program for generating and outputting sounds required for the game, a program for saving game data into the flash memory 34, etc. are also stored.

An operation data storing area 504a is provided in the data storage area 504. The operation data storing area 504a is stored with operation data that is detected according to the operation data detection program 502 in a time series. However, the operation data having been used for processing of the CPU 30 is eliminated from the operation data storing area 504a.

Moreover, the image generation data 504b, the game data 504c, the elapsed time data 504d and the individual play record data 504e are stored in the data storage area 504.

The image generation data 504b is data of polygon data, texture data, etc. The game data 504c is intermediate data or result data at the time of playing the game of this embodiment.

The elapsed time data 504d is data about elapsed time that the game of this embodiment is played. As mentioned above, although the elapsed time is the total play time from a play start up to the present, the time not actually played is not included. The individual play record data 504e is data about the play record that is acquired when the game of this embodiment is played. The play record includes the information on the position of the player character 102 or/and the information on the occurred event corresponding to the elapsed time from a play start.

Although illustration is omitted, in the data storage area 504, other data required for executing the game program is stored, a counter(s) (timer(s)) or/and a flag(s) required for executing the game program are provided.

Figure 11:
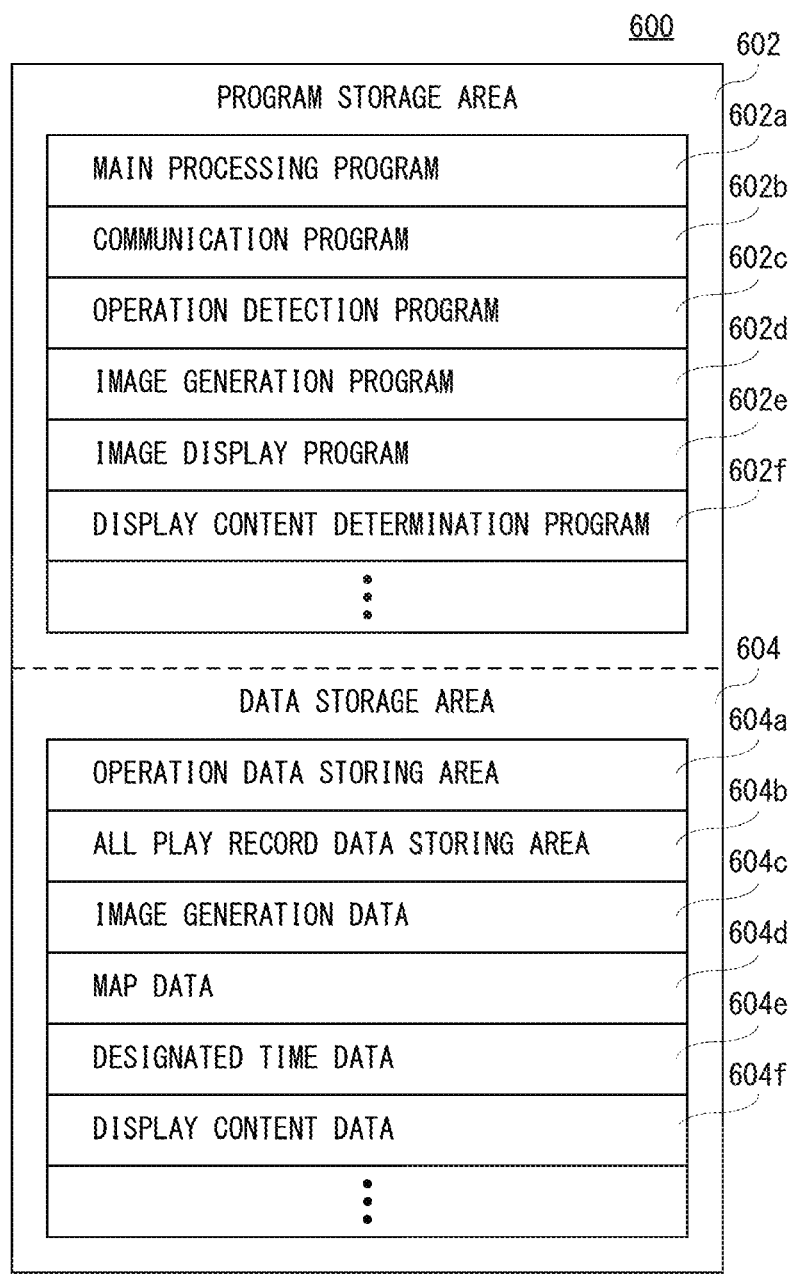
FIG. 11 is an illustration view showing a non-limiting example memory map of a RAM of the personal computer shown in FIG. 3.

FIG. 11 is an illustration view showing a non-limiting example memory map 600 of the RAM 62 of the personal computer 18 shown in FIG. 3. The RAM 62 includes a program storage area 602 and a data storage area 604. The program storage area 602 is stored with a display control program that is an example of an information processing program, and the display control program includes a main processing program 602a, a communication program 602b, an operation detection program 602c, an image generation program 602d, an image display program 602e, a display content determination program 602f, etc. However, the communication program 602b does not need to be included in the display control program.

The main processing program 602a is a program for executing a main routine of display control processing of this embodiment. The communication program 602b is a program for performing communication with other computers and game apparatuses 16. The operation detection program 602c is a program for detecting operation data that is input from the input device 68 and storing the same in the data storage area 604 of the RAM 62.

The image generation program 602d is a program for generating, using image generation data 604c mentioned later, display image data corresponding to various kinds of display images (screens 200, 250, 300, 350, etc.) to be displayed on the display 72. The image display program 602e is a program for outputting the display image data generated according to the image generation program 602d to the display 72. Therefore, a display image is displayed on the display 72. The display content determination program 602f is a program for determining a content (information) to be displayed superposed on the map 150.

Although illustration is omitted, the program storage area 602 is stored with programs for performing other functions that the personal computer 18 is provided with, such as an email function, etc.

An operation data storing area 604a and an all play record data storing areas 604b are provided in the data storage area 604. The operation data storing area 604a is stored with operation data detected according to the operation detection program 602c in a time series. However, the operation data having been used for processing of the CPU 60 is eliminated from the operation data storage area 604a. In the all play record data storing area 604b, data (all play record data) that the individual play record data 504e acquired when a plurality of players independently played the game of this embodiment can be identified for each player are stored.

Moreover, the image generation data 604c, map data 604d, designated time data 604e and display content data 604f are stored in the data storage area 604. The image generation data 604c is data of polygon data, texture data, etc. The map data 604d is image data when viewing a whole of the map 150 of the game of this embodiment from above. The designated time data 604e is data about the elapsed time from a game start, designated by the user. The display content data 604f is data for determining the content (information) to be displayed superposed on the map 150. For example, in the display content data 604f, about each of the position of the player character 102, the movement track (movement course) of the player character 102, a distribution of the number (the passage number) of the player characters 102 passing through respective areas, and the number (the encounter number) of the player characters 102 encountering the predetermined character, whether it is to be displayed or not is described.

Although illustration is omitted, the data storage area 604 is stored with other data required for execution of the display control program and other functions of the personal computer 18, and is provided with a counter(s) (timer(s)) and/or a flag(s) required for execution of the display control program and other functions of the personal computer 18.

Figure 12:
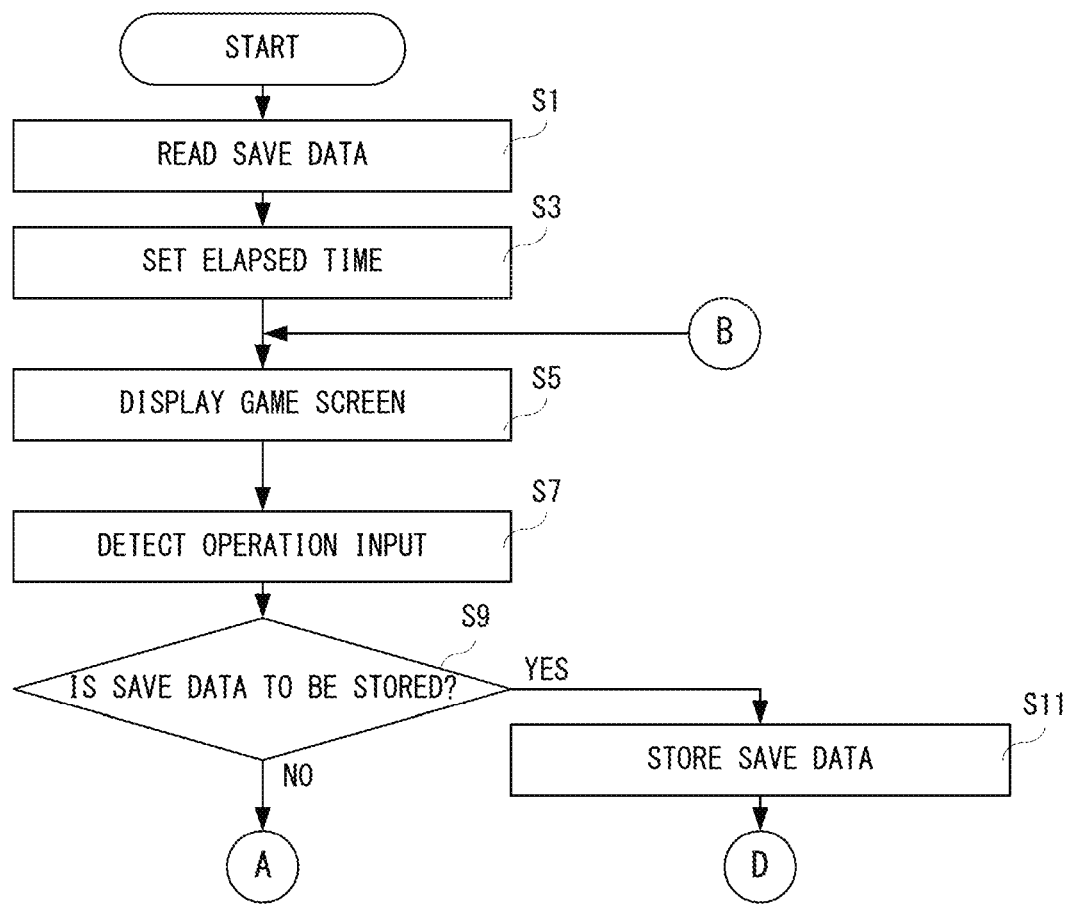
FIG. 12 is a flowchart showing a part of non-limiting example game processing of a CPU of the game apparatus shown in FIG. 2.
Figure 13:
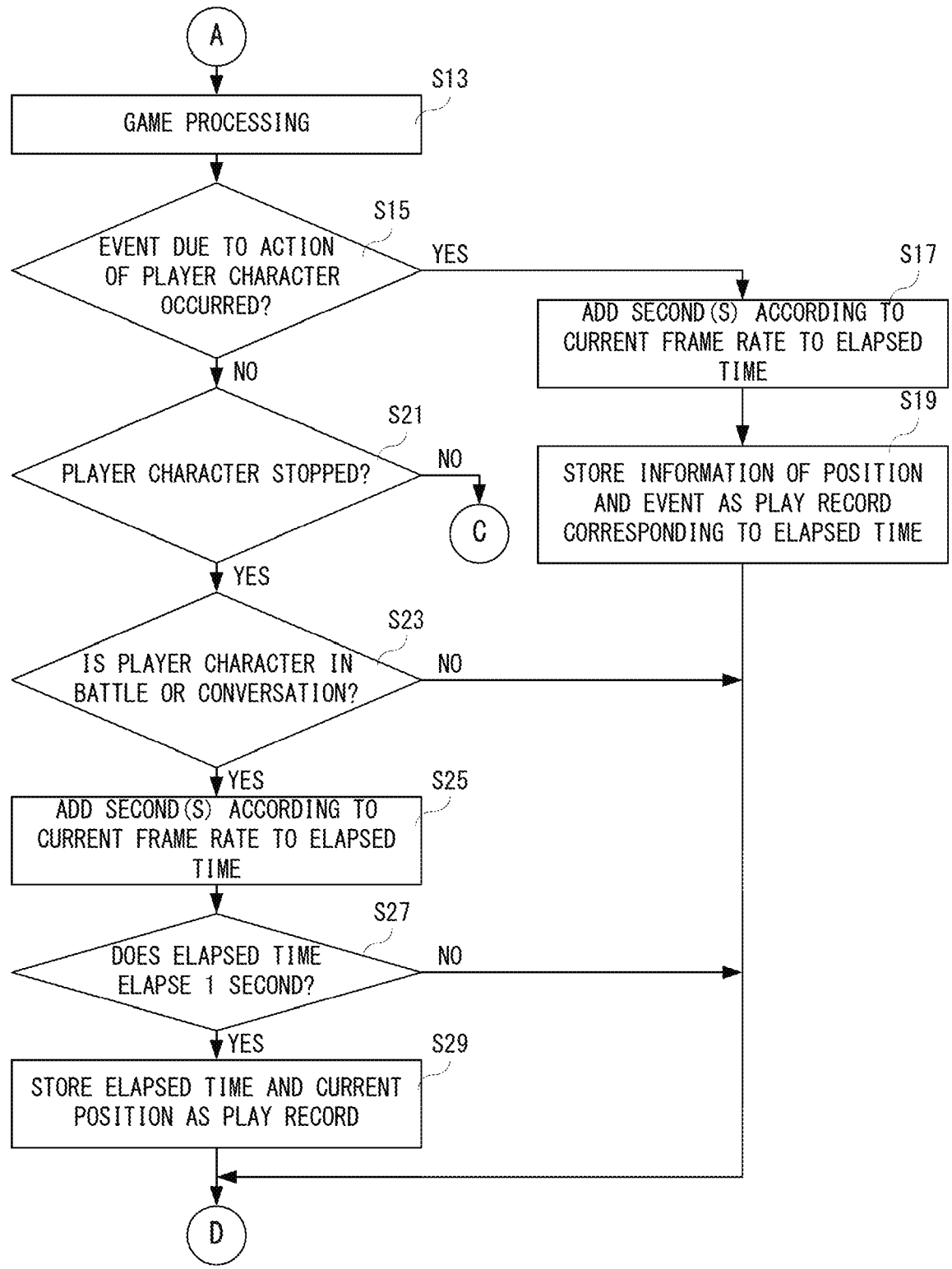
FIG. 13 is a flowchart showing another part of the game processing of the CPU of the game apparatus shown in FIG. 2, following to FIG. 12.
Figure 14:
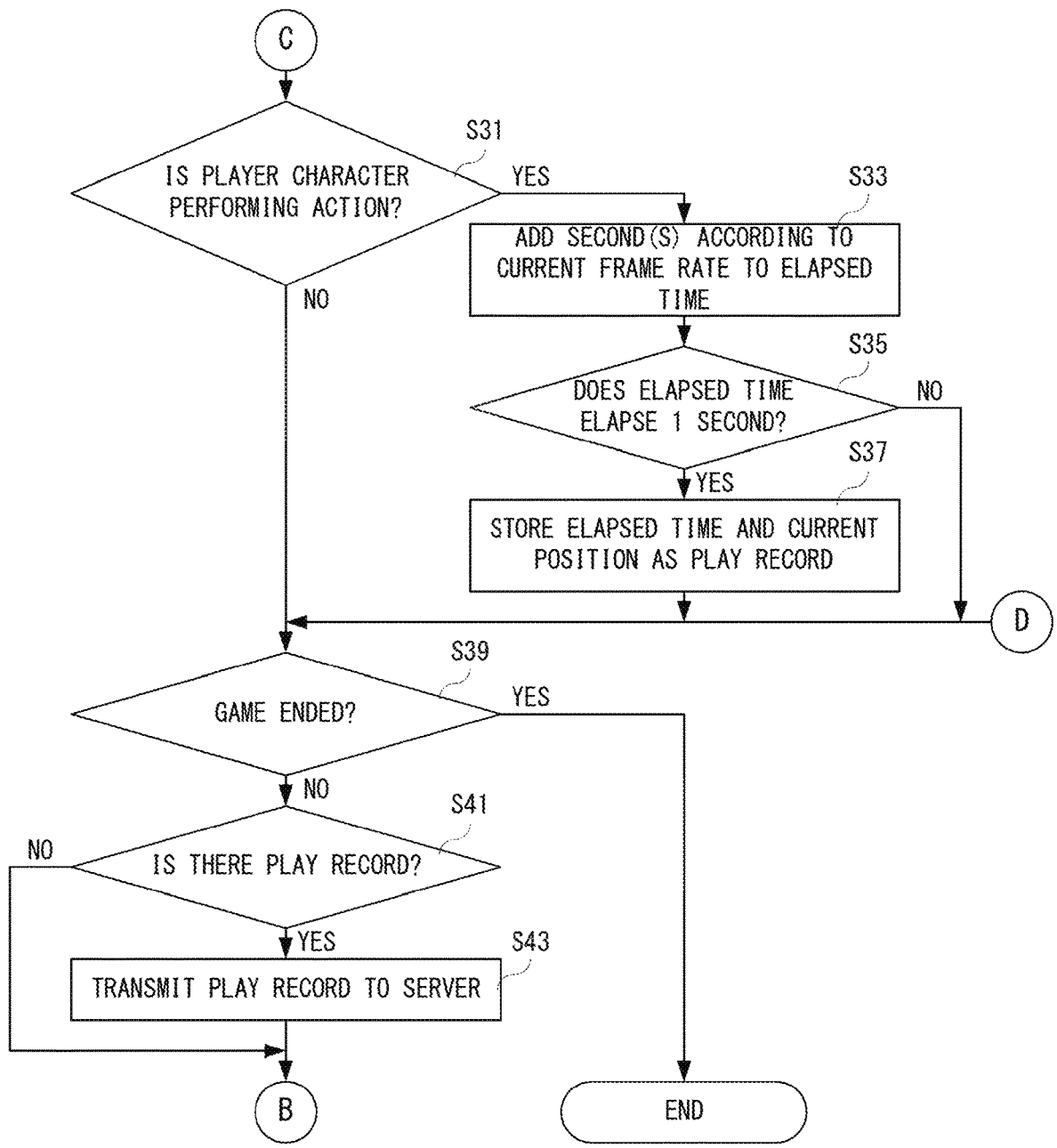
FIG. 14 is a flowchart showing a remaining part of the game processing of the CPU of the game apparatus shown in FIG. 2, following to FIG. 13.

FIG. 12 to FIG. 14 are flow charts showing a non-limiting example game control processing of the CPU 30 of the game apparatus 16. If the player instructs to play a game, as shown in FIG. 12, the CPU 30 of the game apparatus 16 starts the game control processing, and reads save data from the flash memory 34 in a step S1, and in a step S3, sets up elapsed time. In this step S3, the CPU 30 stores the game data 504c and the elapsed time data 504d included in the save data into the data storage area 504 of the RAM 32. However, since no save data is stored when playing the game for the first time, an initial value of the game data 504c and an initial value (0 hour, 0 minute, 0 second) of the elapsed time data 504d are set.

In a next step S5, a game screen 100 as shown in FIG. 4 is displayed on the display 42, and an operation input is detected in a step S7. That is, the CPU 30 detects operation data from the input device 38. Subsequently, it is determined in a step S9 whether storing of save data is instructed. If "YES" is determined in the step S9, that is, if storing of save data is instructed, in a step S11, the save data is stored (updated) in the flash memory 34, and the process proceeds to a step S39 shown in FIG. 14.

On the other hand, if "NO" is determined in the step S9, that is, if storing of save data is not instructed, as shown in FIG. 13, the game processing is performed in a step S13. Here, the game processing is performed according to an operation of the player or irrespective of an operation of the player. For example, according to an operation of the player, an arbitrary action is made to perform, such as moving the player character 102. Moreover, irrespective of an operation of the player, an arbitrary action is made to perform, such as moving the non-player character such as the enemy character 104. Furthermore, according to an operation of the player or irrespective of an operation of the player, the player character 102 is made to acquire the predetermined item. Moreover, as the player character 102 is moved according to an operation of the player, a predetermined character is made to appear (occur), the player character 102 is made to encounter a predetermined character, etc. These are examples of the game processing and should not be limited.

In a subsequent step S15, it is determined whether an event occurred due to an action of the player character 102. If "YES" is determined in the step S15, that is, if an event occurred due to an action of the player character 102, the number of seconds according to the current frame rate is added to the elapsed time in a step S17, and in a step S19, the information on the event and the information on the position of the player character 102 corresponding to the elapsed time are stored as a play record, and the process proceeds to the step S39. That is, in the step S19, the individual play record data 504e corresponding to the play record in which the information on the event and the information on the position are associated with the elapsed time is stored in the data storage area 504 of the RAM 32. This is also true when storing the play record hereinafter.

On the other hand, if "NO" is determined in the step S15, that is, if an event due to an action of the player character 102 did not occur, it is determined in a step S21 whether the player character 102 is stopped. For example, in the step S21, the CPU 30 determines that the player character 102 is being stopped when the position (coordinates) of the player character 102 is the same for a certain time (the coordinates do not change).

If "NO" is determined in the step S21, that is, if the player character 102 is not stopped, the process proceeds to a step S31 shown in FIG. 14. On the other hand, if "YES" determined in the step S21, that is, if the player character 102 is stopped, it is determined in a step S23 whether the player character 102 is in battle or in conversation.

If "NO" is determined in the step S23, that is, if the player character 102 is in neither battle nor conversation, since the player character 102 is being stopped and performs no action, such as a battle and conversation, it is determined that the player does not actually (substantively) play the game (the game is interrupted), and the process proceeds to the step S39.

On the other hand, if "YES" is determined in the step S23, that is, if the player character 102 is in battle or conversation, it is determined that the player is actually playing the game, and the number of seconds according to the current frame rate is added to the elapsed time in a step S25, and it is determined in a step S27 whether the elapsed time elapses 1 (one) second. If "NO" is determined in the step S27, that is, if the elapsed time does not elapse 1 second, the process proceeds to the step S39. On the other hand, if "YES" is determined in the step S27, that is, if the elapsed time elapses 1 second, in a step S29, the elapsed time and the information on the position of the player character 102 are stored as the play record, and the process proceeds to the step S39.

As shown in FIG. 14, it is determined in a step S31 whether the player character 102 is performed an action. If "NO" is determined in the step S31, that is, if the player character 102 is not performed the action, it is determined that the player does not actually play the game, and the process proceeds to the step S39. On the other hand, if "YES" is determined in the step S31, that is, if the player character 102 is performed the action, it is determined that the player actually plays the game, and the number of seconds according to the current frame rate is added to the elapsed time in a step S33, and it is determined in a step S35 whether the elapsed time elapses 1 (one) second. If "NO" is determined in the step S35, the process proceeds to the step S39. On the other hand, if "YES" is determined in the step S35, in a step S37, the elapsed time and the current position are stored as the play record, and the process proceeds to the step S39.

In the step S39, it is determined whether the game is to be ended. Here, it is determined whether the player instructs the game end or the game is over. If "YES" is determined in the step S39, that is, if it is the game end, the game control processing is terminated. On the other hand, if "NO" is determined in the step S39, that is, if it is not the game end, it is determined in a step S41 whether there is any play record. That is, the CPU 30 determines whether the individual play record data 504e is stored in the RAM 32.

If "NO" is determined in the step S41, that is, if there is no play record, the process returns to the step S5 shown in FIG. 12. On the other hand, if "YES" is determined in the step S41, that is, if there is a play record, after transmitting the play record to the server 12 in a step S43, the process returns to the step S5.

In addition, a scan time of the steps S5-S43 is 1 (one) frame, and as mentioned above, since the frame rate is variable, the time added in any one of the steps S17, S25 and S33 is the number of seconds equivalent to 1 frame according to the current frame rate.

Moreover, there is a case where the game (game processing) may be interrupted (paused) due to instructions by the player during the game play, depending on the type of game. In also such a case, in the step S23, it is determined that the play is interrupted. Moreover, if restart of the game is instructed during game interruption, the game (game processing) will be restarted.

Figure 15:
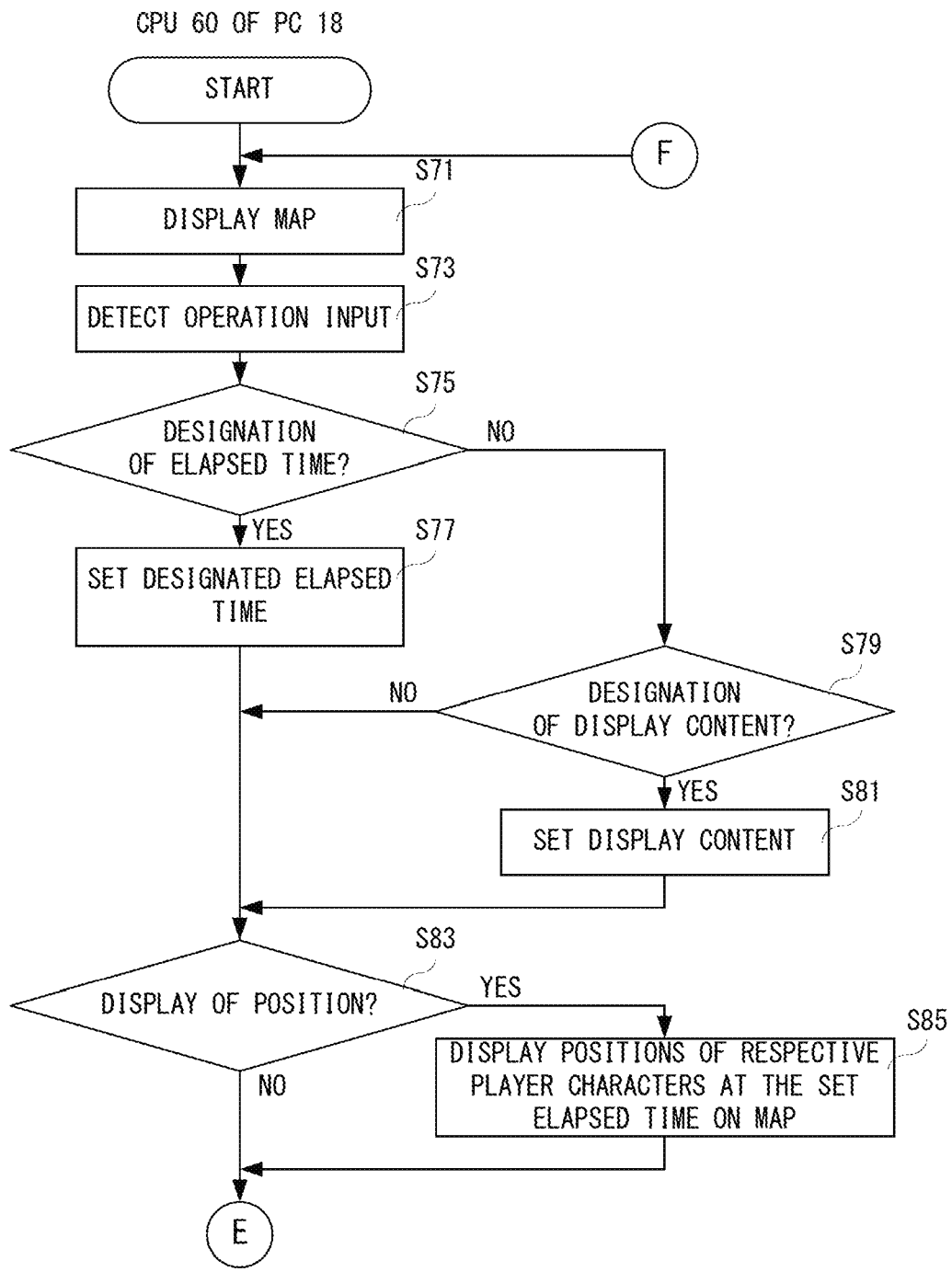
FIG. 15 is a flowchart showing a part of non-limiting example display control processing of a CPU of the personal computer shown in FIG. 3.
Figure 16:
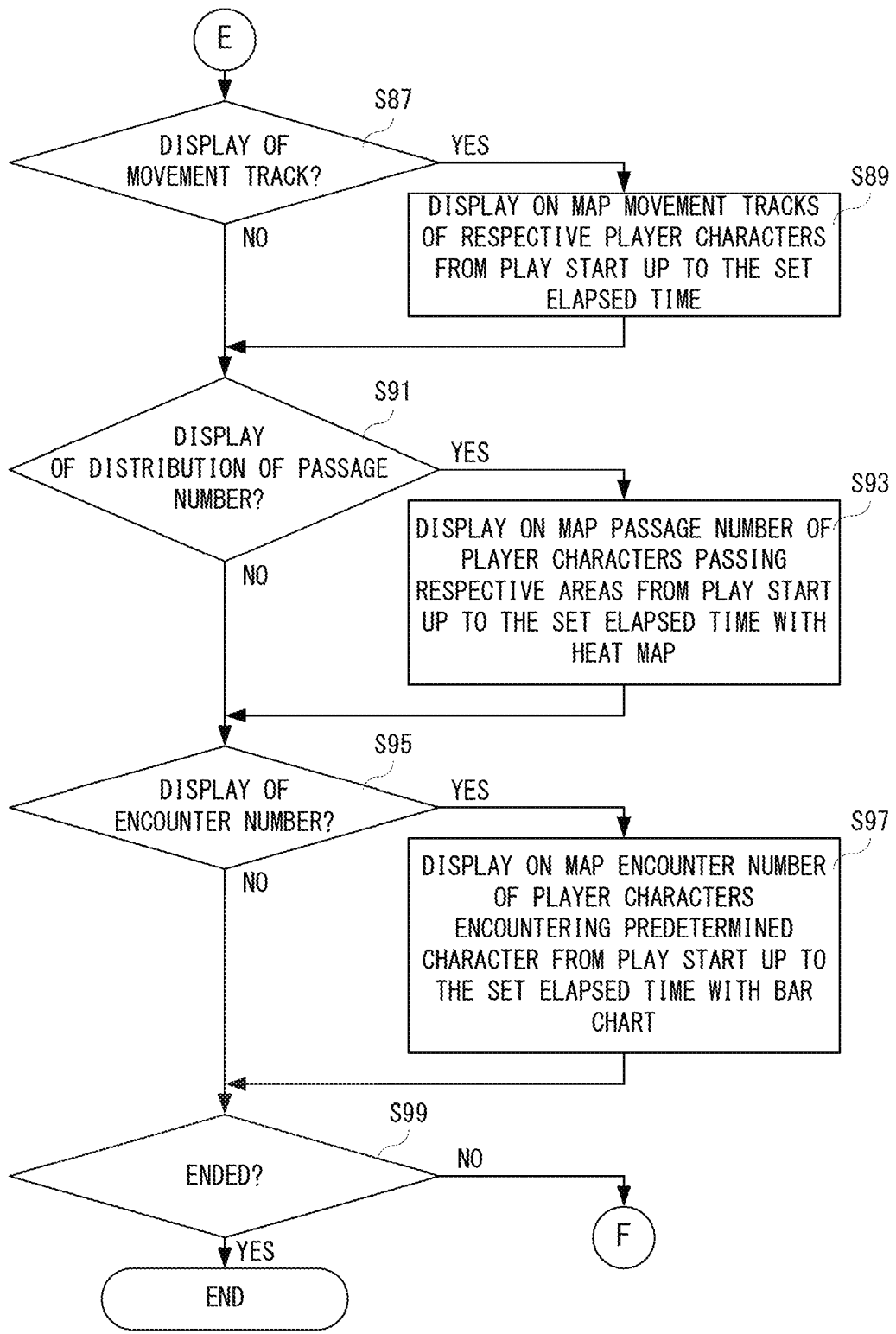
FIG. 16 is a flowchart showing another part of the display control processing of the CPU of the personal computer shown in FIG. 3, following to FIG. 15.

FIG. 15 and FIG. 16 are flow charts showing a non-limiting example display control processing of the CPU 60 of the personal computer 18 shown in FIG. 3. If the user instructs to start the display control processing, the CPU 60 starts the display control processing, and displays the map 150 using the map data 604d in a step S71. In a subsequent step S73, an operation input is detected. That is, the CPU 60 detects the operation data from the input device 68.

Then, it is determined in a step S75 whether the elapsed time is designated. If "YES" is determined in the step S75, that is, if the elapsed time is designated, the designated elapsed time is set in a step S77, and then, the process proceeds to a step S83. That is, in the step S77, the designated time data 604e corresponding to the elapsed time designated by the user is stored (updated) in the data storage area 604 of the RAM 62.

On the other hand, if "NO" is determined in the step S75, that is, if the elapsed time is not designated, it is determined in a step S79 whether the display content is designated. If "NO" is determined in the step S79, that is, if the display content is not designated, the process proceeds to the step S83. On the other hand, if "YES" is determined in the step S79, that is, if the display content is designated, in a step S81, the display content is set, and then, the process proceeds to the step S83. That is, in the step S81, the display content data 604f corresponding to the display content designated by the user is stored (updated) in the data storage area 604 of RAM 62.

In the step S83, it is determined whether the position is to be displayed. Here, the CPU 60 determines whether displaying the position of the player character 102 is selected with reference to the display content data 604f. This is true also to steps S87, S91 and S95 mentioned later.

If "NO" is determined in the step S83, that is, if not displaying the position, the process proceeds to the step S87 shown in FIG. 16. On the other hand, if "YES" is determined in the step S83, that is, if the position is to be displayed, after the positions of respective player characters 102 at the set elapsed time in a step S85 on the map 150, and the process proceeds to the step S87.

As shown in FIG. 16, it is determined in the step S87 whether the movement track 252 is to be displayed. If "NO" is determined in the step S87, that is, if the movement track 252 is not to be displayed, the process proceeds to the step S91. On the other hand, if "YES" is determined in the step S87, that is, if the movement track 252 is to be displayed, after the movement tracks of respective player characters 102 from a play start up to the set elapsed time is displayed on the map 150 in a step S89, the process proceeds to the step S91.

In the step S91, it is determined whether the distribution of the passage number is to be displayed. If "NO" is determined in the step S91, that is, if the distribution of the passage number is not to be displayed, the process proceeds to the step S95. On the other hand, if "YES" is determined in the step S91, that is, if the distribution of the passage number is to be displayed, after the number (passage number) of the player characters 102 passing the respective areas from a play start up to the set elapsed time is displayed on the map 150 with a heat map in a step S93, the process proceeds to the step S95.

In the step S95, it is determined whether the encounter number is to be displayed. If "NO" is determined in the step S95, that is, if the encounter number is not to be displayed, the process proceeds to the step S99. On the other hand, if "YES" is determined in the step S95, that is, if the encounter number is to be displayed, after the number (encounter number) of the player characters 102 encountering the predetermined character from a play start up to the set elapsed time is displayed with a bar chart 352 in a step S97, and the process proceeds to the step S99.

In the step S99, it is determined whether it is to be ended. Here, the CPU 60 determines whether an end instruction is input by the user. If "NO" is determined in the step S99, that is, if it is not to be ended, the process returns to the step S71 shown in FIG. 15. On the other hand, if "YES" is determined in the step S99, that is, if it is to be ended, the display control processing is terminated.

According to this embodiment, since the play records when a plurality of players independently played a predetermined game are displayed while adjusting the elapsed time from a play start, it is possible to present the information that many players played, to be easily utilized.

Moreover, according to this embodiment, since the movement tracks of the respective player characters from a play start up to the elapsed time that is set by the user are displayed on a map, it is possible to visually recognize in what time after a play start a place where the player character reaches and where the player character (player) tends to clog.

In addition, although the number of the player characters encountering the predetermined character from a play start up to the set elapsed time is displayed on the map by the bar chart in this embodiment, it does not need to be limited to this. For example, instead the number of the player characters encountering the predetermined character, or in addition to the number of the player characters encountering the predetermined character, the number of the player characters acquiring the predetermined character may be displayed on a map. For example, the number of the player characters encountering the predetermined character and the number of the player characters acquiring the predetermined character are expressed by bars in different colors in the bar chart.

Moreover, although information on the event corresponding to the event occurred in the game played by the respective players at the set elapsed time is displayed with a text in this embodiment, instead of the information on an event, or in addition to the information on an event, status information of the respective player characters of the respective players may be displayed.

Furthermore, although the play record is transmitted to the server from each game apparatus and the play records are managed by the server in this embodiment, the play records from the respective game apparatuses may be managed by the personal computer while omitting the server.

Furthermore, although this embodiment was explained on a case where the test play is performed, even in game software released, it is possible to collect the play records of the respective payers by applying this embodiment, and to reflect the play records in, for example, a game program to be modified or a game program to be added.

Moreover, although the elapsed time from a play start is made as the play elapsed time and the information on the position of the player character corresponding to the elapsed time from a play start (the information on an event may be added) is acquired as the individual play record in this embodiment, it does not need to be limited to this. It is possible to make the play elapsed time as the elapsed time from a predetermined point (progress situation) in the game, and for example, the individual play record after an intermediate point may be acquired while making the elapsed time from the intermediate point that is a certain place (position) or a certain timing as the play elapsed time. When doing in this way, the play records of the respective players after the intermediate point can be viewed in a bird's-eye view. For example, after knocking down an enemy boss character appearing in the middle of the game, or after reaching a certain town (place), it is possible to know how the respective players moved.

In addition, although this embodiment is explained on a case where a stationary game apparatus is used for game play, it is needless to say that other equipment such as a desktop PC and an arcade game apparatus can be used. Moreover, depending on the type of game, a portable game apparatus or portable terminal can be used, and other portable terminals, such as a notebook PC, a PDA, a tablet PC, etc. can be also used.

Moreover, although the play record was displayed on the display of the personal computer in a visible manner in this embodiment using personal computer, it is also possible to use the game apparatus itself as a game developer machine instead of the personal computer. In such a case, the play record is displayed in a visible manner on the display built in or connected to the game apparatus.

Moreover, the content of the game, a configuration of the game apparatus and the personal computer are mere examples, should not limited to this, and shown in this embodiment, a game apparatus, and personal computer is mere illustration, and should not be limited, but can be appropriately changed according to the actual products. Furthermore, when the same effect (result) is acquired, an order of the steps shown in the flowcharts may be changed suitably.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A display control apparatus, comprising:
    at least one processor configured to execute a program comprising computer-executable instructions to:
    acquire a play record for a player who has played a game having a game space, the play record including position information indicating positions of a player character in the game space for every unit of play time, except play interruption time, the player character being movable on a game map in the game, and the player having played the game in a game play instance
    receive a designation of a play elapsed time; and
    automatically generate for display via a display device and responsive to the received designation of the play elapsed time, a user interface including a visualization of states of the player character in the game across the game play instance based on the acquired play record, the visualization being customized to reflect the states up to the designated play elapsed time and being generated in accordance with a common time scale, the common time scale starting with a common point in game play and extending to total elapsed play time of the player while also excluding the player's play interruption time(s), the states representing movement tracks of the player character in the game in the game play instance such that the visualization is indicative of a level of difficulty of the game.

2. The display control apparatus according to claim 1, wherein the at least one processor is further configured to execute the program to generate for display at least a portion of the game map, indications of the state(s) in the game of the player character being superimposable thereon.

3. The display control apparatus according to claim 2, wherein the game map is divisible into a plurality of areas; and
    wherein (a) a passage number indicating a number of player characters passing through each divided area is displayable in a visible manner for each divided area, and/or (b) an occurrence frequency of an event in the game generated due to an action of the player character is displayable in a visible manner for each divided area.

4. The display control apparatus according to claim 3, wherein a difference in the passage number and/or a difference in the occurrence frequency of an event, is displayable for each divided area, with different colors.

5. The display control apparatus according to claim 1, wherein positions of the player character in the game at the designated play elapsed time are displayable based on the play records of the player.

6. The display control apparatus according to claim 1, wherein at least some of the play records include information on events in the game generated due to actions of the player character, and the information of events in the game at the designated play elapsed time generated due to actions of the player character are displayable based on the play records of the player.

7. The display control apparatus according to claim 6, wherein an occurrence frequency of an event relevant to one or more characters in the game is displayable.

8. The display control apparatus according to claim 1, wherein at least some of the play record include status information of the player character, and the status information of the player character in the game up to the designated play elapsed time is displayable based on the play records of the player.

9. The display control apparatus according to claim 1, wherein the at least one processor is further configured to execute the program to acquire the play records from a network.

10. The display control apparatus according to claim 1, wherein the player plays the game in a plurality of game play instances and wherein the visualization of states of the player character in the game is provided across the plurality of game play instances.

11. The display control apparatus according to claim 10, wherein the game is playable by a plurality of players, the visualization displaying states for player characters of each of the different players.

12. A display control system comprising a server and a display control apparatus communicably connected to the server, wherein:
    the server comprises:
        at least one first processor configured to execute a first program comprising first computer-executable instructions to acquire, from a game apparatus of a player, a play record for the player who has played a game having a game space, the play record including position information indicating positions of a player character in the game space for every unit of play time, except play interruption time, the player character being movable on a game map in the game, and the player having played the game in a game play instance and
        a transceiver controllable to transmit the acquired play records to the display control apparatus, and
    the display control apparatus comprises at least one second processor configured to execute a second program comprising second computer-executable instructions to:
    acquire the play records transmitted by the transceiver;
    receive a designation of a play elapsed time; and
    automatically generate for display via a display device and responsive to the received designation of the play elapsed time, a user interface including a visualization of states of the player character in the game across the game play instance based on the acquired play record, the visualization being customized to reflect the states up to the designated play elapsed time and being generated in accordance with a common time scale, the common time scale starting with a common point in game play and extending to total elapsed play time of the player while also excluding the player's play interruption time(s), the states representing movement tracks of the player character in the game in the game play instance such that the visualization is indicative of a level of difficulty of the game.

13. The display control system according to claim 12, wherein at least a portion of the game map is displayable, with indications of the states in the game of the player character being superimposable thereon.

14. The display control system according to claim 13, wherein the game map is divisible into a plurality of areas, and
wherein (a) a passage number indicating a number of player characters passing through each divided area is displayable in a visible manner for each divided area, and/or (b) an occurrence frequency of an event in the game generated due to an action of the player character is displayable in a visible manner for each divided area.

15. A display control method of a computer, the method comprising:
acquiring a play record for a player who has played a game having a game space, the play record including position information indicating positions of a player character in the game space for every unit of play time, except play interruption time, the player character being movable on a game map in the game, and the player having played the game in a game play instance
receiving a designation of a play elapsed time; and
automatically generating for display via a display device and responsive to the received designation of the play elapsed time, a user interface including a visualization of states of the player character in the game across the game play instance based on the acquired play record, the visualization being customized to reflect the states up to the designated play elapsed time and being generated in accordance with a common time scale, the common time scale starting with a common point in game play and extending to total elapsed play time of the player while also excluding the player's play interruption time(s), the states representing movement tracks of the player character in the game in the game play instance such that the visualization is indicative of a level of difficulty of the game.

16. The method according to claim 15, further comprising generating for display at least a portion of the game map, indications of the states in the game of the player character being superimposable thereon.

17. The method according to claim 16, wherein the game map is divisible into a plurality of areas, and
wherein (a) a passage number indicating a number of player characters passing through each divided area is displayable in a visible manner for each divided area, and/or (b) an occurrence frequency of an event in the game generated due to an action of the player character is displayable in a visible manner for each divided area.

18. The method according to claim 15, further comprising generating for display indications of the states in the game of the player character up to the designated play elapsed time, based on the play records of the player.

19. A non-transitory computer-readable storage medium storing a display control program executable by a computer, wherein the display control program causes one or more processors of the computer to at least execute:
acquiring a play record for a player who has played a game having a game space, the play record including position information indicating positions of a player character in the game space for every unit of play time, except play interruption time, the player character being movable on a game map in the game, and the player having played the game in a game play instance
receiving a designation of a play elapsed time; and
automatically generating for display via a display device and responsive to the received designation of the play elapsed time, a user interface including a visualization of states of the player character in the game across the game play instance based on the acquired play record, the visualization being customized to reflect the states up to the designated play elapsed time and being generated in accordance with a common time scale, the common time scale starting with a common point in game play and extending to total elapsed play time of the player while also excluding the player's play interruption time(s) the states representing movement tracks of the player character in the game in the game play instance such that the visualization is indicative of a level of difficulty of the game.

20. The non-transitory computer-readable storage medium according to claim 19, wherein:
at least a portion of the game map is displayable, with indications of the states in the game of the player character being superimposable thereon;
the map is divisible into a plurality of areas; and
(a) a passage number indicating a number of player characters passing through each divided area is displayable in a visible manner for each divided area, and/or (b) an occurrence frequency of an event in the game generated due to an action of the player character is displayable in a visible manner for each divided area.

* * * * *